US012004272B2

(12) United States Patent
Feng et al.

(10) Patent No.: US 12,004,272 B2
(45) Date of Patent: Jun. 4, 2024

(54) LOW-POWER ELECTRO-THERMAL FILM DEVICES AND METHODS FOR MAKING THE SAME

(71) Applicants: Guanping Feng, Jiangsu (CN); Wuxi Graphene Film Co., Ltd., Jiangsu (CN)

(72) Inventors: Guanping Feng, Wuxi (CN); Huabing Tan, Guangzhou (CN); Haibin Liu, Harbin (CN); Huizhong Zhu, Beijing (CN)

(73) Assignees: Guanping Feng, Wuxi (CN); Wuxi Graphene Film Co., Ltd., Wuxi (CN)

( * ) Notice: Subject to any disclaimer, the term of this patent is extended or adjusted under 35 U.S.C. 154(b) by 1116 days.

(21) Appl. No.: 16/820,410

(22) Filed: Mar. 16, 2020

(65) Prior Publication Data

US 2020/0221547 A1 Jul. 9, 2020

Related U.S. Application Data

(63) Continuation of application No. 15/014,224, filed on Feb. 3, 2016, now Pat. No. 10,631,372.

(30) Foreign Application Priority Data

Apr. 24, 2015 (CN) ......................... 201510203320.1
Apr. 24, 2015 (CN) ......................... 201510203373.3

(51) Int. Cl.
*H05B 3/84* (2006.01)
*C23F 1/14* (2006.01)

(52) U.S. Cl.
CPC .................. *H05B 3/84* (2013.01); *C23F 1/14* (2013.01); *H05B 2203/011* (2013.01); *H05B 2203/013* (2013.01)

(58) Field of Classification Search
CPC .......... A41H 41/005; Y10T 428/23936; Y10T 428/23943; Y10T 428/23957;
(Continued)

(56) References Cited

U.S. PATENT DOCUMENTS 3,721,800 A 3/1973 Eisler
3,874,330 A 4/1975 Zoccolini
(Continued)

FOREIGN PATENT DOCUMENTS

CN 2190388 Y 2/1995
CN 1717126 A 1/2006
(Continued)

OTHER PUBLICATIONS

Extended European Search Report dated Jul. 26, 2019, issued in related European Patent Application No. 16782628.8 (6 pages).
(Continued)

*Primary Examiner* — Nathaniel E Wiehe
*Assistant Examiner* — Ket D Dang
(74) *Attorney, Agent, or Firm* — Sheppard Mullin Richter & Hampton LLP

(57) ABSTRACT

A low-power transparent electro-thermal film device is provided. The device includes a transparent substrate, a transparent conductor layer disposed at least one side of the transparent substrate, and a plurality of inner electrodes disposed on the transparent conductor layer and including a first plurality of inner electrodes extending in a comb shape from a first electrode bus bar and a second plurality of inner electrodes extending in the comb shape from a second electrode bus bar. The first plurality of inner electrodes inter-lock with the second plurality of inner electrodes.

19 Claims, 27 Drawing Sheets

(58) Field of Classification Search
CPC .. Y10T 428/23979; C23F 1/14; G03F 7/0047; G03F 7/022; G03F 7/023; G03F 7/0392; G03F 7/0752; H05B 2203/006; H05B 2203/011; H05B 2203/013; H05B 3/84
USPC .......................................................... 219/522
See application file for complete search history.

(56) References Cited

U.S. PATENT DOCUMENTS

| | | | | |
|---|---|---|---|---|
| 3,982,092 | A | 9/1976 | Marriott | |
| 4,034,207 | A * | 7/1977 | Tamada | H05B 3/10 337/159 |
| 4,401,881 | A | 8/1983 | Saito | |
| 4,459,470 | A | 7/1984 | Shlichta et al. | |
| 4,847,472 | A | 7/1989 | Koontz | |
| 4,857,711 | A | 8/1989 | Watts | |
| 4,931,627 | A | 6/1990 | Watts | |
| 5,006,696 | A | 4/1991 | Uchida et al. | |
| 5,059,756 | A | 10/1991 | Henschenp et al. | |
| 5,181,006 | A | 1/1993 | Shafe et al. | |
| 5,517,003 | A | 5/1996 | Kadooka et al. | |
| 5,716,536 | A | 2/1998 | Yokoto et al. | |
| 5,824,994 | A | 10/1998 | Noda et al. | |
| 5,938,957 | A | 8/1999 | Tanahashi et al. | |
| 6,084,217 | A | 7/2000 | Bulgajewski | |
| 6,307,188 | B1 | 10/2001 | Bulgajewski | |
| 6,426,485 | B1 | 7/2002 | Bulgajewski et al. | |
| 7,053,344 | B1 | 5/2006 | Surjan et al. | |
| 7,202,444 | B2 * | 4/2007 | Bulgajewski | H05B 3/34 219/217 |
| 8,816,257 | B2 | 8/2014 | Kim et al. | |
| 2003/0015515 | A1 | 1/2003 | Ito et al. | |
| 2004/0100131 | A1 | 5/2004 | Howick et al. | |
| 2007/0221646 | A1 | 9/2007 | Shin et al. | |
| 2007/0246455 | A1 | 10/2007 | Landsberger et al. | |
| 2010/0038356 | A1 | 2/2010 | Fukuda et al. | |
| 2010/0170889 | A1 | 7/2010 | Keite-Telgenbuscher et al. | |
| 2011/0260741 | A1 | 10/2011 | Weaver et al. | |
| 2012/0055918 | A1 | 3/2012 | Yue et al. | |
| 2014/0021195 | A1 * | 1/2014 | Kim | H05B 3/84 219/553 |
| 2014/0187140 | A1 | 7/2014 | Lazanja et al. | |

FOREIGN PATENT DOCUMENTS

| | | | | |
|---|---|---|---|---|
| CN | 2768365 | A | | 3/2006 |
| CN | 1790557 | A | | 6/2006 |
| CN | 101150893 | A | | 3/2008 |
| CN | 101500348 | A | | 8/2009 |
| CN | 104219797 | A | | 12/2014 |
| CN | 204222693 | U | | 3/2015 |
| CN | 104869676 | A | | 8/2015 |
| CN | 104883760 | A | | 9/2015 |
| DE | 10028173 | A1 | | 12/2001 |
| EP | 0560677 | A | | 9/1993 |
| JP | S63-069500 | U | | 5/1988 |
| JP | H07-024907 | U | | 5/1995 |
| JP | 2006-019286 | A | | 1/2006 |
| JP | 2006-302670 | A | | 11/2006 |
| JP | 2006302670 | A | * | 11/2006 |
| JP | 2007-280788 | A | | 10/2007 |
| JP | 2008-041298 | A | | 2/2008 |
| JP | 2011-003429 | A | | 1/2011 |
| JP | 2011-014267 | A | | 1/2011 |
| JP | 2011070964 | A | * | 4/2011 |
| KR | 10-2009-0131903 | A | | 12/2009 |

OTHER PUBLICATIONS

Notice of Reasons for Refusal dated Dec. 27, 2018, issued in related Japanese Patent Application No. 2018-506470, with English machine translation (9 pages).
Notice of Reasons for Refusal dated Nov. 29, 2019, issued in related Japanese Patent Application No. 2018-506470, with English machine translation (17 pages).
First Search dated Feb. 17, 2016, issued in related Chinese Patent Application No. 201510203320.1 (2 pages).
First Office Action dated Mar. 2, 2016, issued in related Chinese Patent Application No. 201510203320.1, with English machine translation (13 pages).
First Search dated Jan. 24, 2018, issued in related Chinese Patent Application No. 201510837576.8 (1 page).
First Office Action dated Feb. 5, 2018, issued in related Chinese Patent Application No. 201510837576.8, with English machine translation (16 pages).
Second Office Action dated Oct. 25, 2018, issued in related Chinese Patent Application No. 201510837576.8, with English machine translation (18 pages).
Notification of Reason for Refusal dated Dec. 26, 2018, issued in related Korean Patent Application No. 10-2017-7033959, with English machine translation (15 pages).
PCT International Search Report and the Written Opinion dated Jul. 26, 2016, issued in related International Application No. PCT/CN2016/079763, with partial English translation (10 pages).
PCT International Preliminary Report on Patentability dated Nov. 2, 2017, issued in related International Application No. PCT/CN2016/079763, with English translation (12 pages).

* cited by examiner

100

2000a

2000b

3000a

3000b

3000c

5000a

5000b

5000c

7000

8000

9000

10000

11000

12000

13000

15000

16000

18000a

18000b

19000

20000a

20000b

LOW-POWER ELECTRO-THERMAL FILM DEVICES AND METHODS FOR MAKING THE SAME

CROSS REFERENCE TO RELATED APPLICATION

The present application is a continuation application of U.S. application Ser. No. 15/014,224, filed Feb. 3, 2016, which is based on and claims the benefits of priority to Chinese Application No. 201510203373.3, filed Apr. 24, 2015, and Chinese Application No. 201510203320.1, filed Apr. 24, 2015. The above-referenced applications are incorporated herein by reference in their entirety.

TECHNICAL FIELD

The present application relates to low-power electro-thermal film devices and methods for making such devices.

BACKGROUND

Transparent electro-thermal films are usually electroplated with a transparent conductor layer, on top of which electrodes are placed. The electrodes form on two parallel metal strips, as shown in FIG. 1, one connected to a positive voltage input and the other connected to a negative voltage input, such that a current flowing through the conductor layer generates heat. When materials with a high sheet resistance are used as the conductor layer, the supply voltage has also to be high in order to achieve required heating effect. This affects portability and is potentially unsafe. Moreover, although increasing the thickness of the conductor layer may lower the supply voltage, it causes high manufacturing costs and lowers productivity and device transparency.

Some transparent electro-thermal films may not achieve low input power by using new materials or patterned electrodes, and have to use multiple (5-6) layers of conductor layers. Moreover, heating in such films may not be evenly distributed, having a temperature variance of more than 60K on the same device. These factors may prevent such films from having any practical use.

SUMMARY

One aspect of the present disclosure is directed to a low-power transparent electro-thermal film device. The device includes a transparent substrate, a transparent conductor layer disposed at least one side of the transparent substrate, and a plurality of inner electrodes disposed on the transparent conductor layer and including a first plurality of inner electrodes extending in a comb shape from a first electrode bus bar and a second plurality of inner electrodes extending in the comb shape from a second electrode bus bar. The first plurality of inner electrodes inter-lock with the second plurality of inner electrodes.

Another aspect of the present disclosure is directed to a method of fabricating a low-power transparent electro-thermal film. The method comprises disposing a transparent conductor layer on a metal foil substrate, disposing a transparent substrate on the transparent conductor layer, disposing a mask on the metal foil, developing patterns on the mask by photolithography or printing, immersing the metal foil in a corrosive fluid to etch away parts unprotected by the patterns, and removing the mask patterns to obtain patterned electrodes.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In this disclosure, some known constants include a resistivity of copper being $1.75\times10^{-8}$ Ωm, a resistivity of silver paste being $8\times10^{-8}$ Ωm, and a resistivity of single-layer graphene being $1\times10^{-8}$ Ωm. Exemplary lower-power transparent electro-thermal film devices consistent with this disclosure can be powered by common lithium batteries and quickly reach 90-180° C. The input power may be less than 12V. When single-layer graphene is used as a transparent conductor layer of the device, the input power can be below 1.5V and heating effect is provided by the transparent conductor layer.

[Exemplary Implementation 1]

Figure 1:
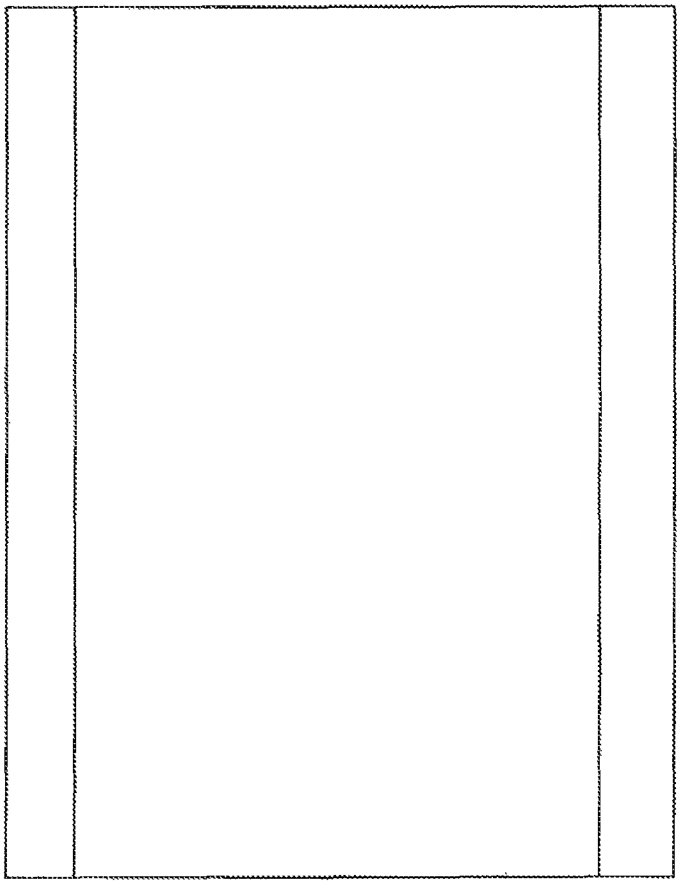
FIG. 1 is a block diagram illustrating an electro-thermal film device consistent with the present disclosure.
Figure 2A:
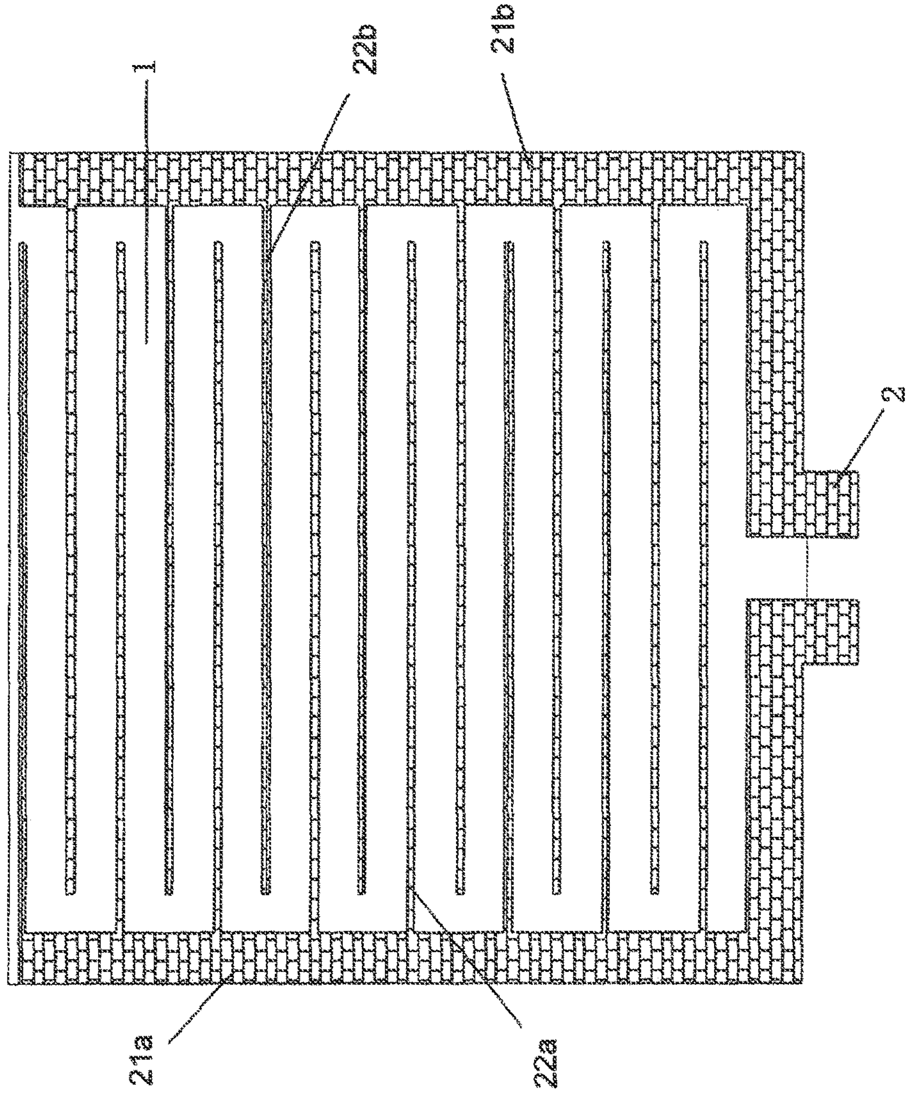
FIG. 2A is a schematic top view of an embodiment of a low-power transparent electro-thermal film device consistent with the present disclosure.

FIG. 2A is a schematic top view of an embodiment of a low-power transparent electro-thermal film device 2000*a* consistent with the present disclosure. It is not necessary that the electro-thermal film device 2000*a* be transparent. In some other embodiments, the device may not be transparent. For example, device may be translucent or opaque. The device includes a transparent conductor 1, electrode bus bars 21*a* and 21*b*, and inner electrodes 22*a* and 22*b* (which may constitute a set of electrodes). Inner electrodes 22*a* and 22*b* may be disposed on the same side or two different sides of the conductor layer to promote even heating across the device. In some embodiments, conductor 1 may be opaque or translucent. Some similar components are not labeled to keep the illustration clean. The electrode bus bars 21*a* and 21*b* and the inner electrodes 22*a* and 22*b* may have many configurations as described below. The components described above form a planar pattern. In one embodiment, the inner electrodes are each 1 millimeter wide and 6 millimeters apart between one another. The inner electrodes may be line-shape, wave-shaped, or saw-tooth shaped. The first or second plurality inner electrodes may, respectively with the first or second electrode bus bar, form a shape including a line-shape, a curve-shape, a circle, or an ellipse. The inner electrodes may connect in series or in parallel with another set of inner electrodes. The device 2000*a* may be configured to connect in series or in parallel with another similar device.

FIG. 2A describes inner electrodes including a first plurality of inner electrodes (22*a* and similar parts) branching in a comb shape from a first electrode bus bar (21*a*) and a second plurality of inner electrodes (22*b* and similar parts) branching in the comb shape from a second electrode bus bar (21*b*). The first plurality of inner electrodes inter-lock with the second plurality of inner electrodes. The first and second plurality of inner electrodes may be alternatively disposed and evenly distributed in the same plane. Each one of the first inner electrodes is separated from each neighboring inter-locking second inner electrode by the transparent conductor layer. The first electrode bus bar may be configured to connect to a positive power input terminal and the second electrode bus bar may be configured to connect to a negative power input terminal, or vice versa. When connected, a current flows from one electrode bus bar to inner electrodes on the electrode bus bar, then to the conductor 1, then to inner electrodes on the other electrode bus bar, then to the other electrode bus bar.

The transparent conductor layer may be a semiconductor or a ceramic layer. Materials of the transparent conductor layer may include at least one of graphene, carbon nanotube, Indium tin oxide (ITO), Fluorine-doped tin oxide (FTO), or Aluminum doped zinc oxide (AZO). Materials of the inner electrodes may include transparent conductors. Materials of the inner electrodes may include at least one of silver, silver paste, copper, copper paste, aluminum, ITO, or graphene. Materials of the transparent substrate may include glasses or polymers. Materials of the transparent substrate may include at least one of polyethylene terephthalate (PET), polyvinyl chloride (PVC), polyethylene (PE), polycarbonate (PC), polyethylene terephthalate (PET), polymethyl methacrylate (PMMA), polyvinylidene fluoride (PVDF), polyaniline (PANI), or multi-layer graphene. In one example, the inner electrodes are copper foil inner electrodes. In another example, the conductor layer is single-layer graphene.

Figure 2B:
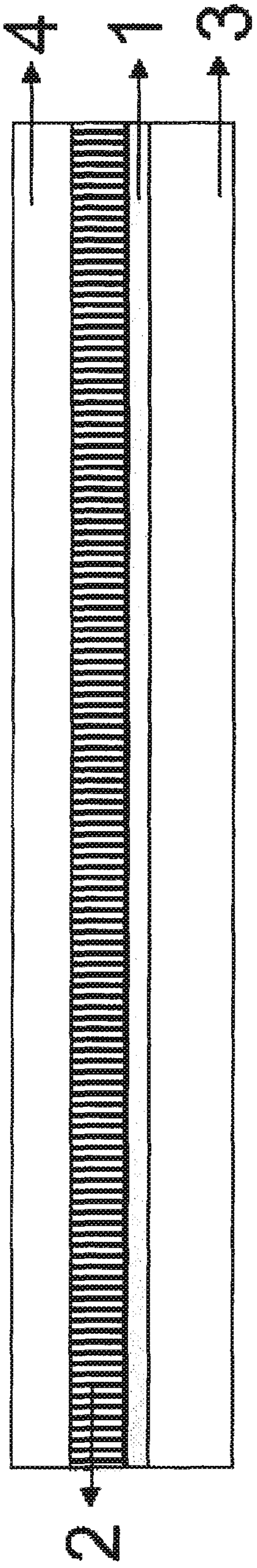
FIG. 2B is a schematic side view of an embodiment of a low-power transparent electro-thermal film device consistent with the present disclosure.

FIG. 2B is a schematic side view of an embodiment of a low-power transparent electro-thermal film device 2000*b* consistent with the present disclosure. 2000*a* and 2000*b* may describe the same device from different views. The device 2000*b* includes a transparent conductor layer 1, an inner electrode 2, a transparent substrate 3, and a transparent protection layer 4. Materials of the protection layer may be flexible transparent materials and may include at least one of PET, PVC, PE, or PC.

In some embodiments, a method of fabricating the device 2000*a*/2000*b* includes the following steps, some of which are optional:

1: disposing graphene on a transparent substrate. The graphene may be single-layer graphene, doped (with an inorganic or organic dopant, e.g., $Fe(NO_3)_3$, $HNO_3$, and $AuCl_3$), and/or have a sheet resistance of 250 Ω/sq. The substrate may be polyethylene terephthalate (PET). The substrate may be 150 millimeters wide and 150 millimeters long and 125 micron-meters thick.

2: printing a silver paste pattern on the graphene. The printing may include screen printing. The silver paste pattern may be the pattern described above with reference to FIG. 2A. The printed silver paste may be used as electrodes. The silver paste may be 25 micron-meters thick.

3. solidifying the silver paste. The solidifying step may include heating in an oven at 130° C. for 40 minutes.

4. disposing optically clear adhesive (OCA) glue on a protection layer. The protection layer may be PET. The protection layer may match the size of the substrate, e.g. 150 millimeters wide and 150 millimeters long. The OCA glue may be 50 micron-meters thick.

5. drilling a plurality of holes on the protection layer and the OCA glue at positions that correspond to the electrode bus bar on the substrate to expose electrodes in the following steps. The drilling can be implemented by a laser. The hole size may be 5 millimeters by 5 millimeters.

6. disposing protection layer with optically clear adhesive (OCA) glue on top of the substrate patterned with the silver paste.

7. making electrical contacts from the exposed electrodes.

Figure 3A:
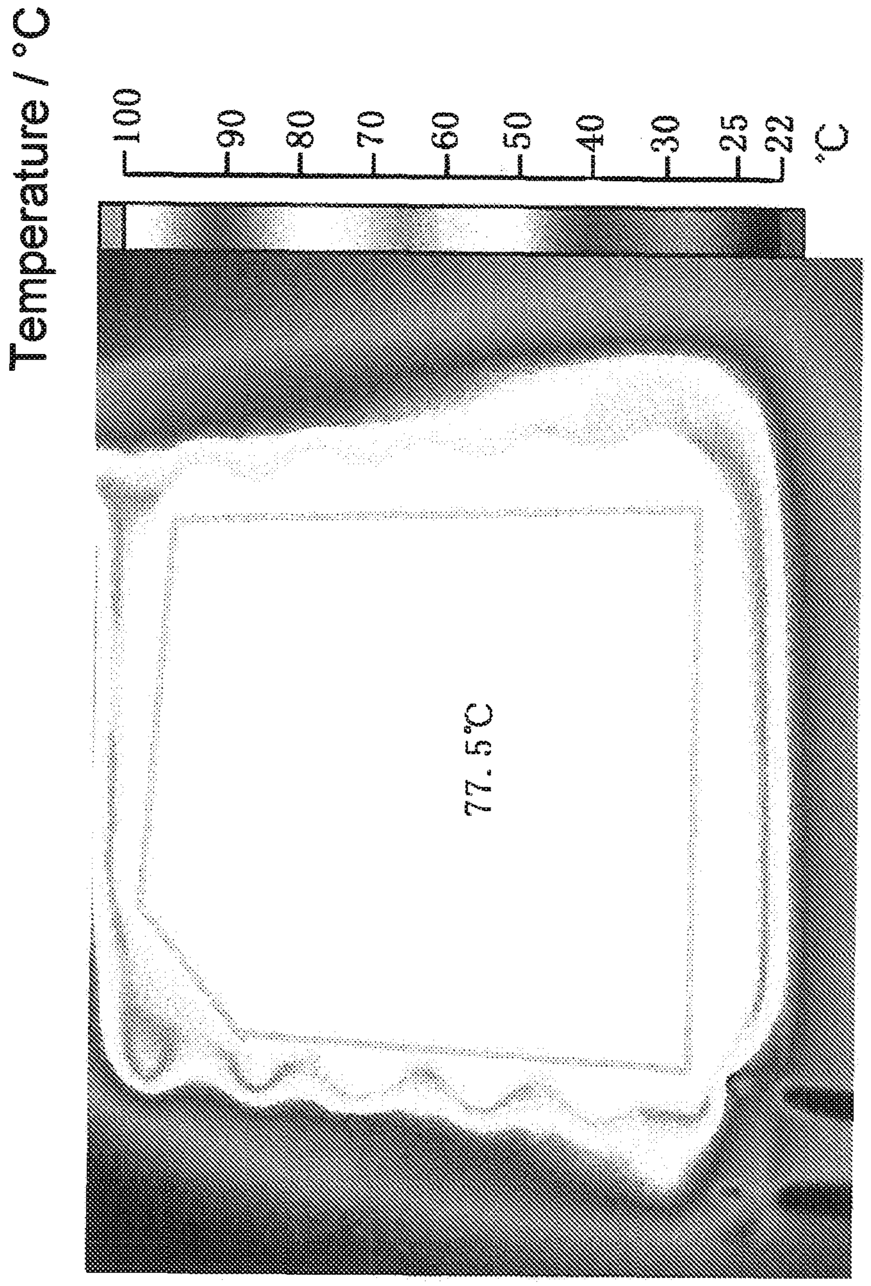
FIG. 3A is a graphical representation of temperature distribution in an embodiment of a low-power transparent electro-thermal film device consistent with the present disclosure.

FIG. 3A is a graphical representation of temperature distribution 3000*a* in an embodiment of a low-power transparent electro-thermal film device (implementing steps 1-3) consistent with the present disclosure. 3000*a* may be captured by an infra-red camera. A stable condition can be reached in 60 seconds after connecting the device to a 5V power supply. 3000*a* describes temperature distribution in a heated low-power transparent electro-thermal film device described above. The average temperature is 77.5° C., consistent with $T=kU^2/d^2R+t$, with T being a final temperature the device rises to when subjected to an input power, t being a starting temperature in ° C., T being the final temperature in ° C., U being the input power in V no more than 12V, d being a distance between two neighboring inner electrodes, R being a sheet resistance of the transparent conductor layer in Ω/sq, and k being a constant in a range of 10-200° C. $cm^2$ $W^{-1}$ and being inversely proportional to a thermal conductance between the device and the air. In this example, t is 22° C. and k is 200° C. $cm^2$ $W^{-1}$.

In this example, heating power of the device reaches 1500 $W/m^2$ when 3.7 V of voltage is applied, much more than that of a traditional electro-thermal film device reaching about 5.4 $W/m^2$ with the same power supply. Further, the traditional electro-thermal film device would have needed 612 V power input to reach the same amount of heating power, which is more than the safe power level that humans can withstand.

Figure 3B:
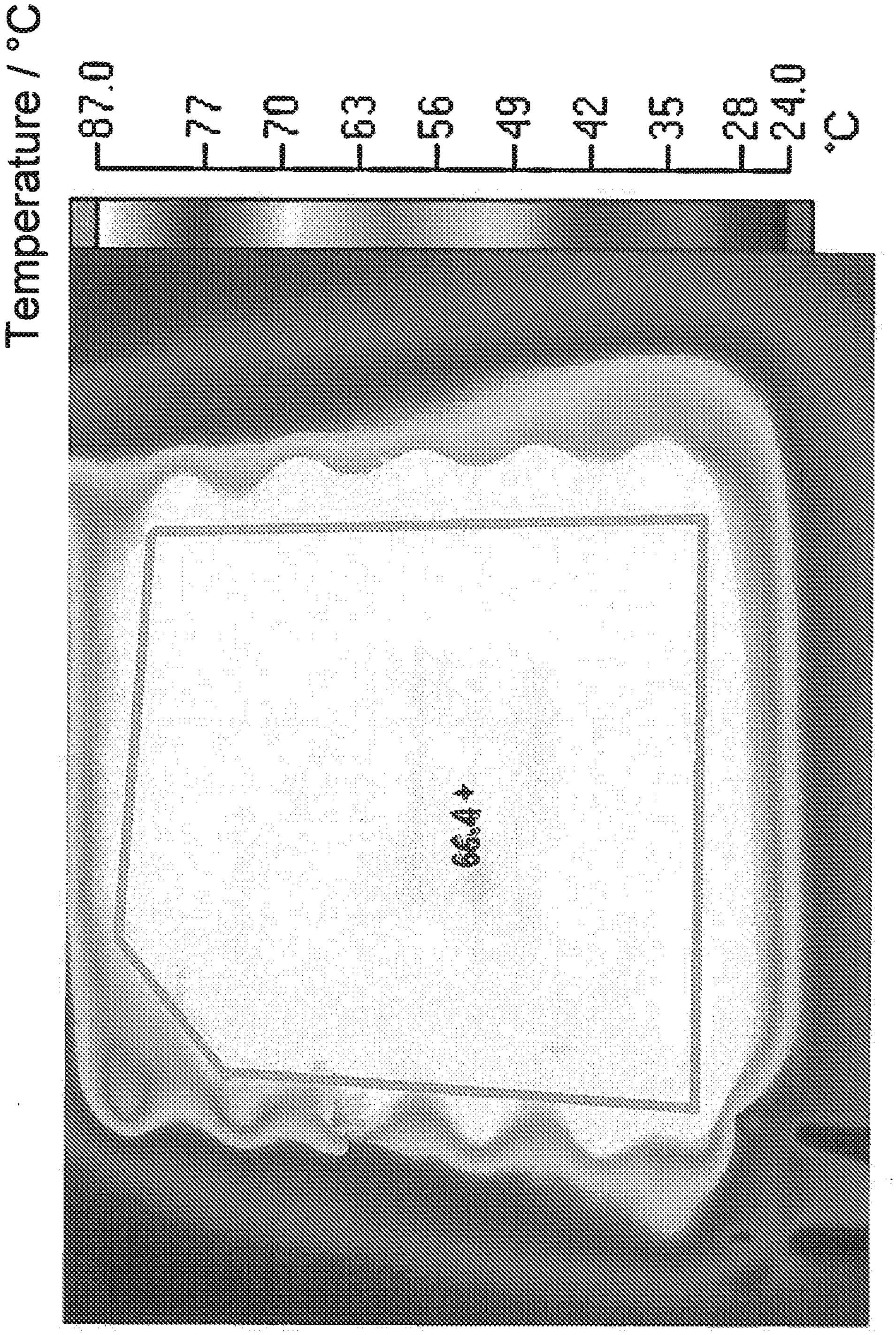
FIGS. 3B-3C are graphical representations of temperature distribution in an embodiment of another low-power transparent electro-thermal film device consistent with the present disclosure.
Figure 3C:
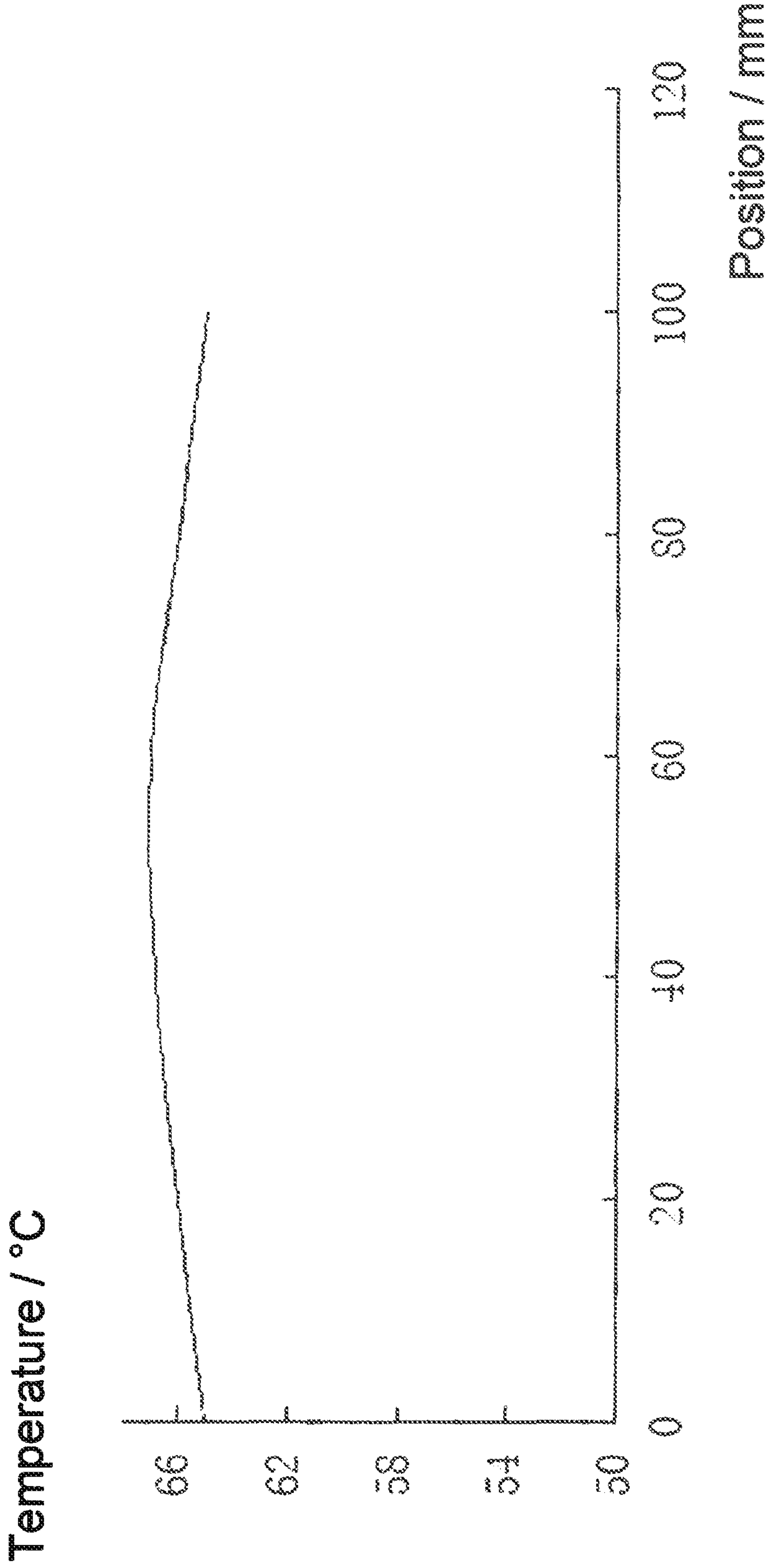

FIG. 3B is a graphical representation 3000*b* of temperature distribution in an embodiment of a low-power transparent electro-thermal film device (implementing steps 1-7) consistent with the present disclosure. 3000*b* may be captured by an infra-red camera. A resistance of the device is measured to be 2.7Ω. 3000*b* describes temperature distribution in a heated low-power transparent electro-thermal film device described above. FIG. 3C is a graphical representation 3000*c* of temperature distribution in the embodiment of a low-power transparent electro-thermal film device consistent with the present disclosure. 3000*c* describes the temperature distribution across the device. The average temperature is 66° C., consistent with $T=kU^2/d^2R+t$ described above, and k=158° C. $cm^2$ $W^{-1}$. In this example, t is 22° C. and k is 133° C. $cm^2$ $W^{-1}$. In this example, heating power of the device reaches 1300 $W/m^2$ when 3.7 V of voltage is applied, much more than that of a traditional electro-thermal film device reaching about 5 $W/m^2$ with the same power supply. Further, the traditional electro-thermal film device would have needed 60 V power input to reach the same amount of heating power, which is more than the safe power level that humans can withstand.

[Exemplary Implementation 2]

Figure 4:
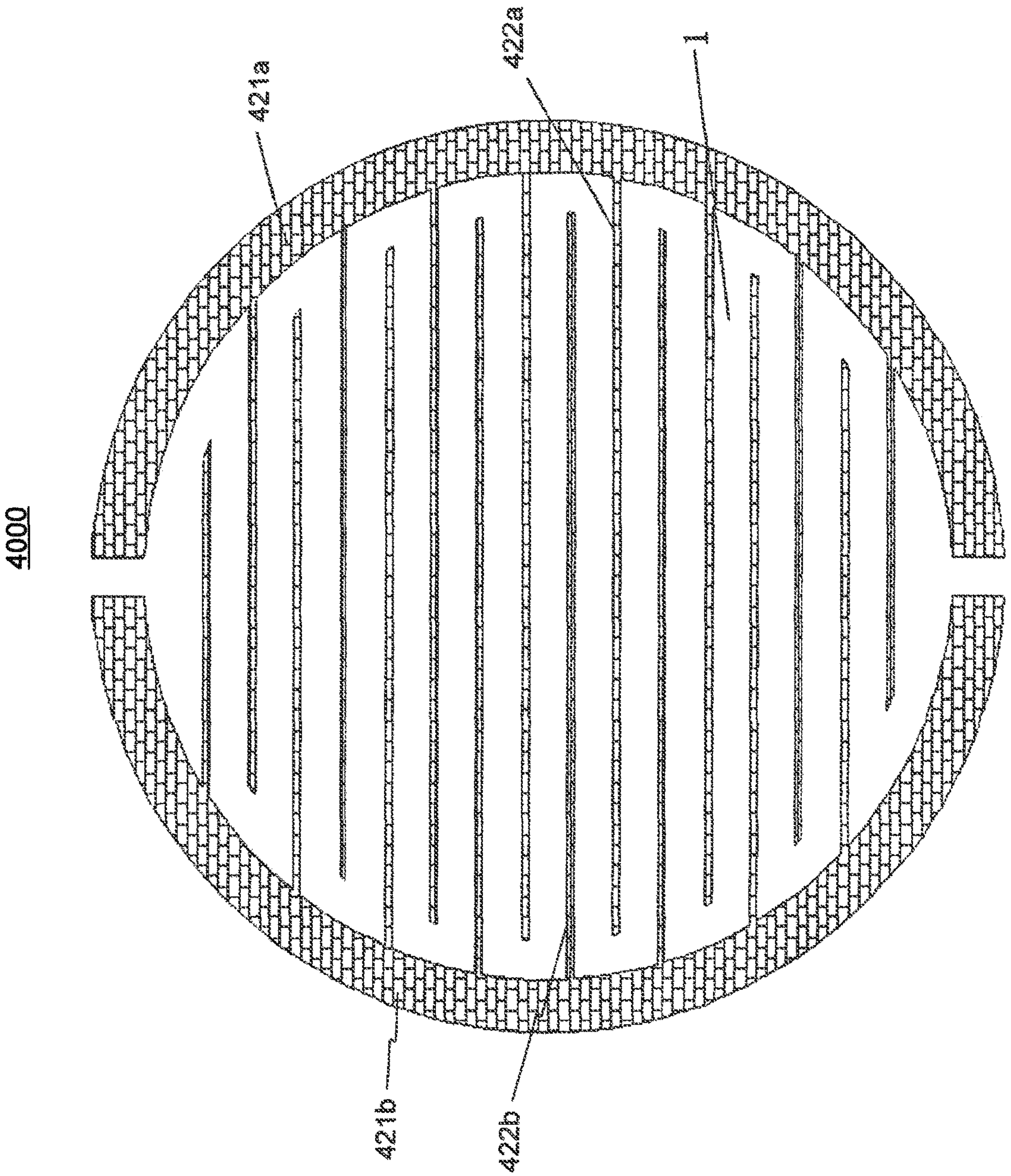
FIG. 4 is a schematic top view of an embodiment of another low-power transparent electro-thermal film device consistent with the present disclosure.

FIG. 4 is a schematic top view of an embodiment of a low-power transparent electro-thermal film device 4000 consistent with the present disclosure. The device includes a transparent conductor 1, electrode bus bars 421*a* and 421*b*, and inner electrodes 422*a* and 422*b*. Some similar components are not labeled to keep the illustration clean. The described components form a planar pattern. The electrode bus bars 421*a* and 421*b* are disposed in a circular shape of a 96 millimeters diameter. The longest inner electrode is 73 millimeters long. The inner electrodes are 6 millimeter apart from one another. There are a total of 17 separations among the inner electrodes. Each of the inner electrodes is 1 millimeters wide. The electrode bus bars are 8 millimeters wide. On each electrode bus bar, a farthest distance between two inner electrodes is 130 millimeters.

In some embodiments, a method of fabricating the device 4000 includes the following steps, some of which are optional:

1: disposing graphene on a transparent substrate. The graphene may be double-layer graphene, doped, and/or have a sheet resistance of 250 Ω/sq. The substrate may be polyethylene terephthalate (PET). The substrate may be 120 millimeters wide and 120 millimeters long and 125 micron-meters thick.

2: printing a silver paste pattern on the graphene. The printing may include screen printing. The silver paste pattern may be the pattern described above with reference to FIG. 4. The printed silver paste may be used as electrodes. The silver paste may be 25 micron-meters thick.

3. solidifying the silver paste. The solidifying step may include heating in an oven at 130° C. for 40 minutes.

4. disposing optically clear adhesive (OCA) glue on a protection layer. The protection layer may be PET. The protection layer may match the size of the substrate, e.g. 120 millimeters wide and 120 millimeters long. The OCA glue may be 50 micron-meters thick.

5. drilling a plurality of holes on the protection layer and the OCA glue at positions that correspond to the electrode bus bar on the substrate to expose electrodes in the following steps. The hole size may be 5 millimeters by 5 millimeters.

6. disposing protection layer with optically clear adhesive (OCA) glue on top of the substrate patterned with the silver paste.

7. making electrical contacts from the exposed electrodes.

Figure 5A:
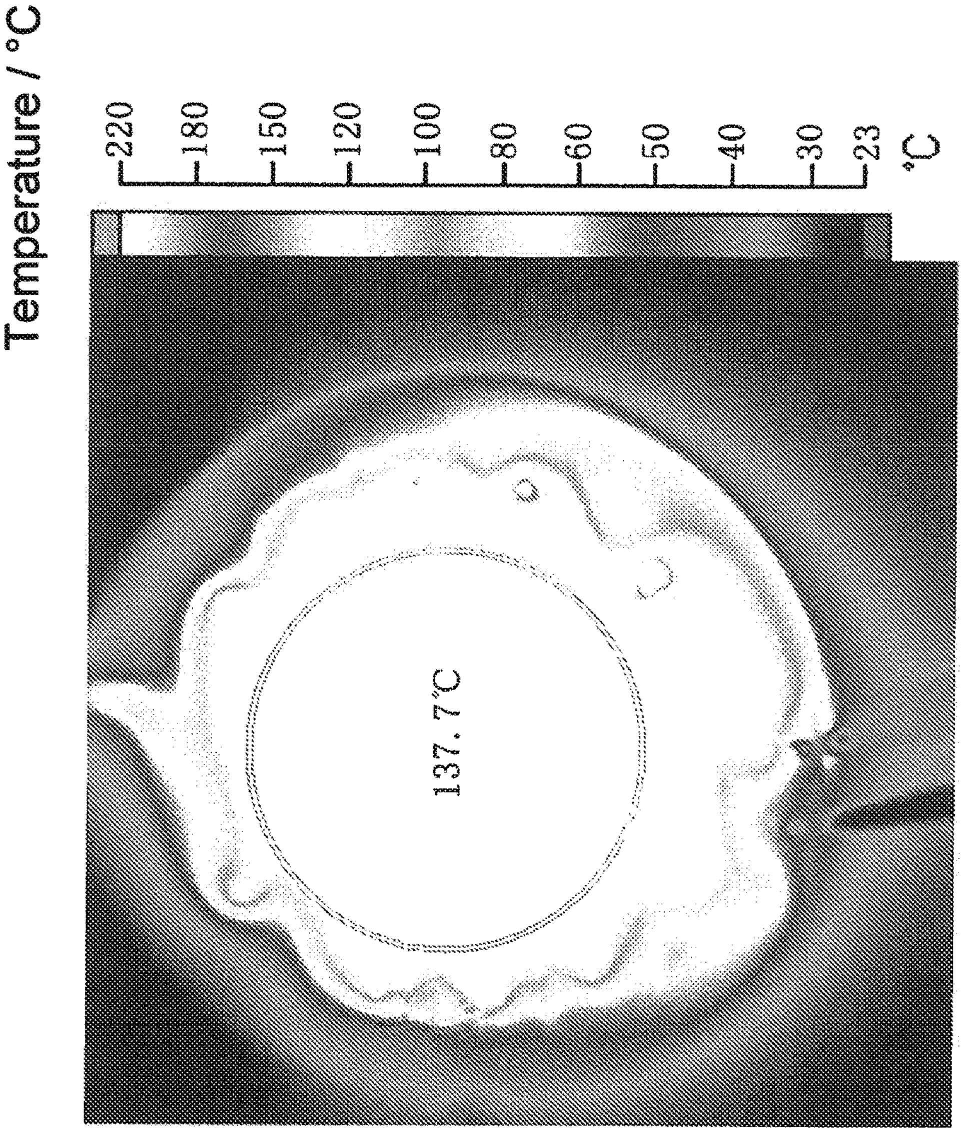
FIG. 5A is a graphical representation of temperature distribution in an embodiment of another low-power transparent electro-thermal film device consistent with the present disclosure.

FIG. 5A is a graphical representation of temperature distribution 5000*a* in an embodiment of a low-power transparent electro-thermal film device (implementing steps 1-3) consistent with the present disclosure. 5000*a* may be captured by an infra-red camera. A stable condition can be reached in 60 seconds after connecting the device to a 5V power supply. 5000*a* describes temperature distribution in a heated low-power transparent electro-thermal film device described above. The average temperature is 137.7° C., consistent with $T=kU^2/d^2R+t$ described above. In this example, t is 22° C. and k is 200° C. $cm^2$ $W^{-1}$. In this example, heating power of the device reaches 3168 $W/m^2$ when 3.7 V of voltage is applied, much more than that of a traditional electro-thermal film device reaching about 11.4 $W/m^2$ with the same power supply. Further, the traditional electro-thermal film device would have needed 616.6V power input to reach the same amount of heating power, which is more than the safe power level that humans can withstand.

Figure 5B:
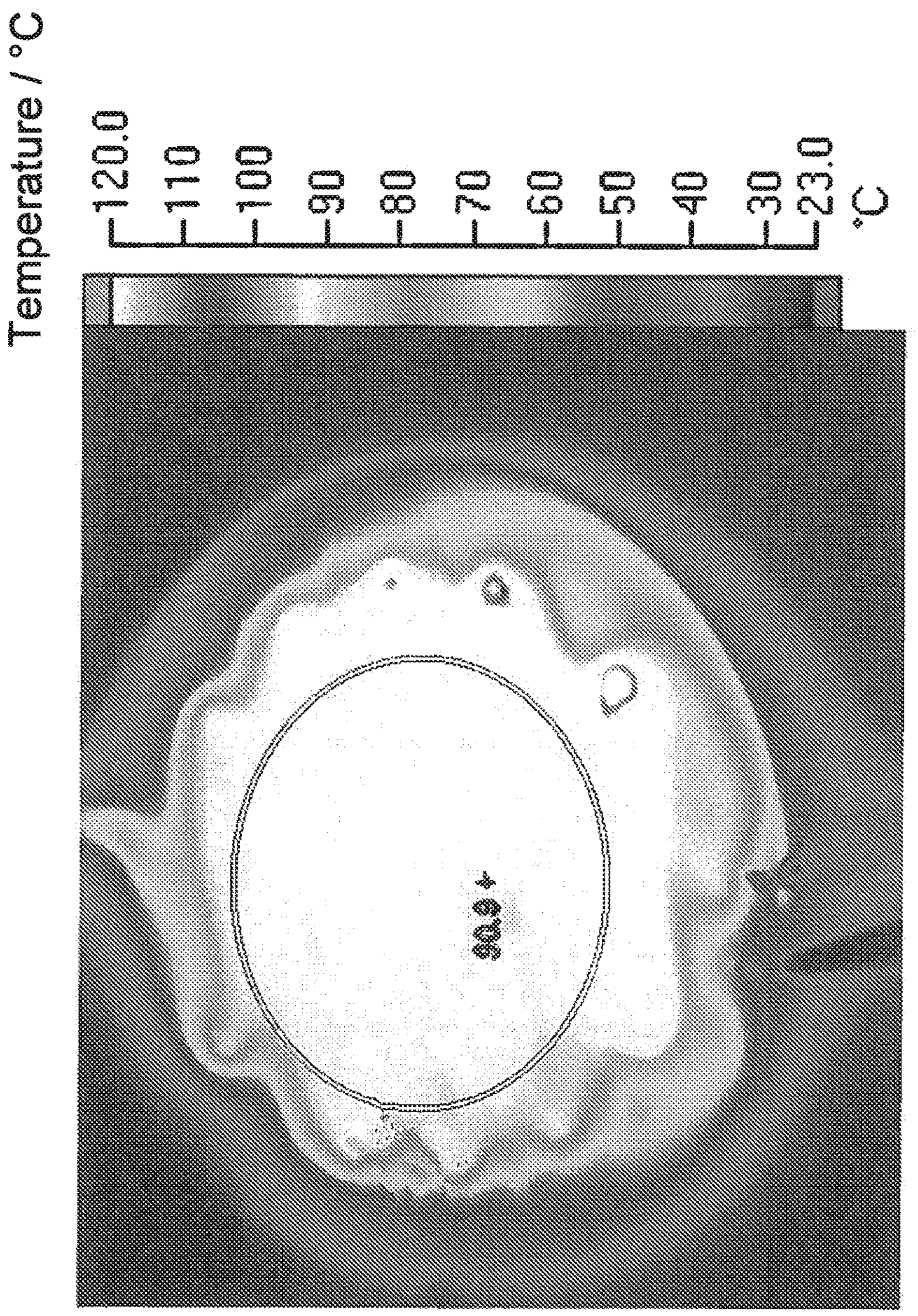
FIGS. 5B-5C are graphical representations of temperature distribution in an embodiment of another low-power transparent electro-thermal film device consistent with the present disclosure.
Figure 5C:
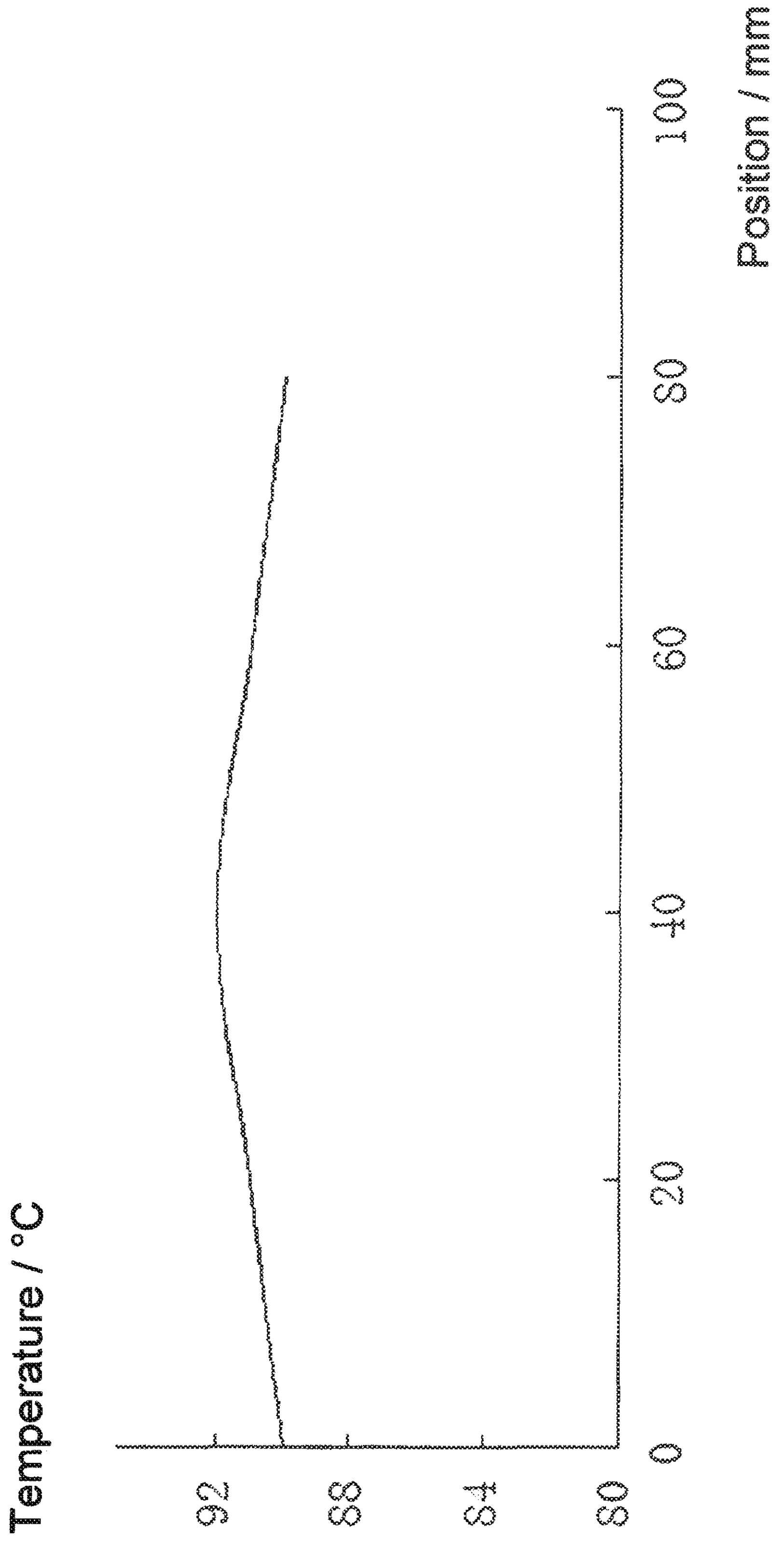

FIG. 5B is a graphical representation 5000*b* of temperature distribution in an embodiment of a low-power transparent electro-thermal film device (implementing steps 1-7) consistent with the present disclosure. 5000*b* may be captured by an infra-red camera. A stable condition can be reached in 40 seconds after connecting the device to a 5 V power supply. A resistance of the device is measured to be 2Ω. 5000*b* describes temperature distribution in a heated low-power transparent electro-thermal film device described above. FIG. 5C is a graphical representation 5000*c* of temperature distribution in an embodiment of a low-power transparent electro-thermal film device consistent with the present disclosure. 5000*c* describes the temperature distribution across the device. The average temperature is 90.9°

C., consistent with $T=kU^2/d^2R+t$ described above. In this example, t is 22° C. and k is 119.1° C. $cm^2$ $W^{-1}$. In this example, heating power of the device reaches 1300 $W/m^2$ when 3.7 V of voltage is applied, much more than that of a traditional electro-thermal film device reaching about 5 $W/m^2$ with the same power supply. Further, the traditional electro-thermal film device would have needed 60 V power input to reach the same amount of heating power, which is more than the safe power level that humans can withstand. In this example, a voltage variation on the electrodes bus bar does not exceed 0.2% and a voltage variation on the inner electrodes does not exceed 0.004%.

[Exemplary Implementation 3]

Figure 6:
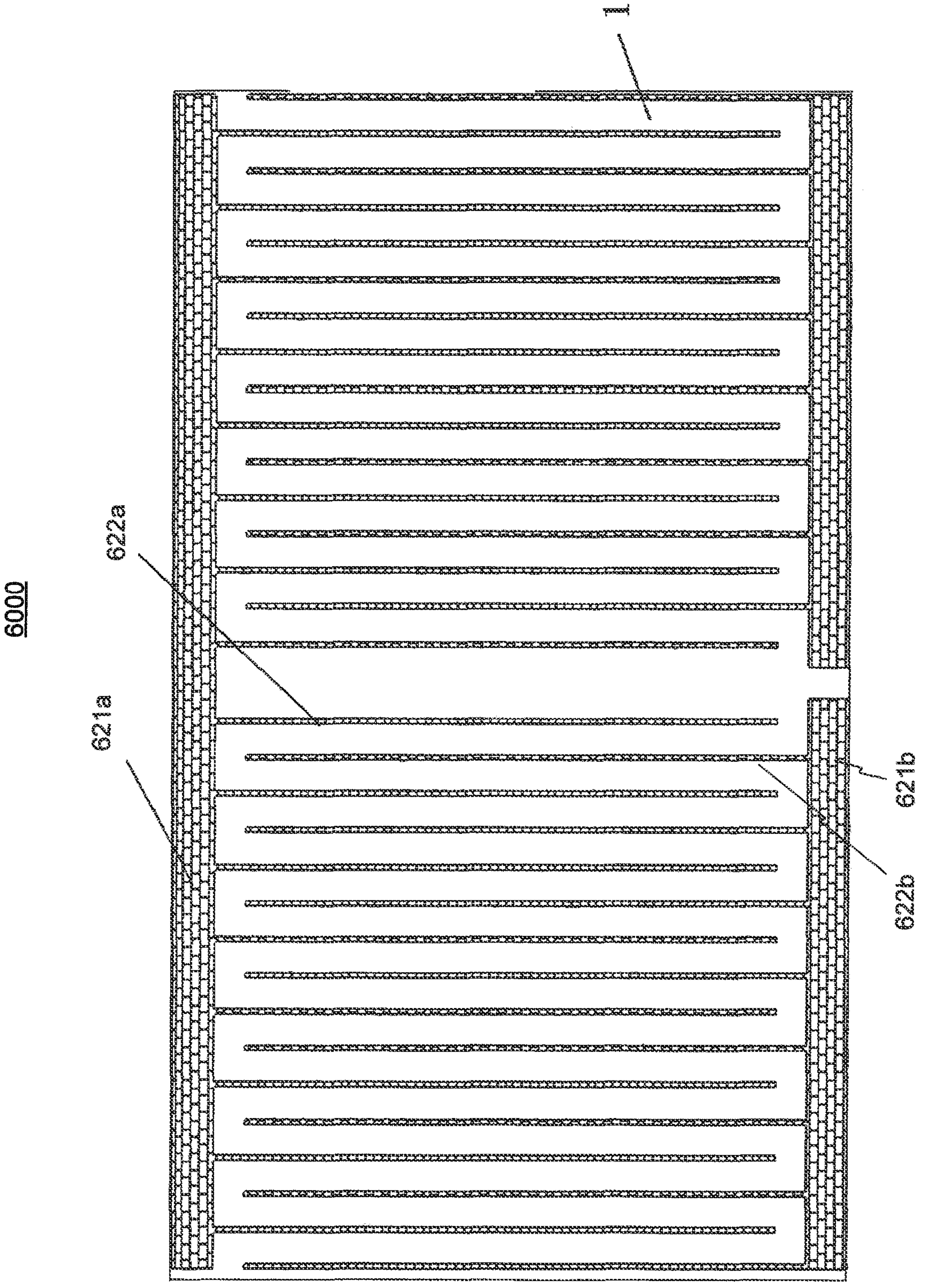
FIG. 6 is a schematic top view of an embodiment of another low-power transparent electro-thermal film device consistent with the present disclosure.

FIG. 6 is a schematic top view of an embodiment of a low-power transparent electro-thermal film device 6000 consistent with the present disclosure. The device includes a transparent conductor 1, electrode bus bars 621*a* and 621*b*, and inner electrodes 622*a* and 622*b*. Some similar components are not labeled to keep the illustration clean. The described components form a planar pattern. The inner electrodes are 3 millimeters apart from one another, 108 millimeters long, 1 millimeter wide. There are 32 inner electrodes, creating 30 separations. The electrode bus bars are each 8 millimeters wide. On each electrode bus bar, a farthest distance between two inner electrodes is 100 millimeters. A left half of 6000 and a right half of 6000 are connected in series, such that voltage on each is half of the total voltage applied to 6000.

In some embodiments, a method of fabricating the device 6000 includes the following steps, some of which are optional:

1: disposing graphene on a metal foil and gluing the graphene onto a substrate. The graphene may be doped and/or have a sheet resistance of 250 Ω/sq. The substrate may be polyethylene terephthalate (PET). The metal foil may be glued with a ultra-violet curable adhesive, a hot glue, or a silica gel. The metal foil may be 140 millimeters by 280 millimeters in dimension and 25 micron-meters thick. The substrate may be 300 millimeters by 150 millimeters in dimension and 125 micron-meters thick. The metal foil may be a copper foil, a nickel foil, or a copper-nickel alloy foil.

2: curing the adhesive. The curing exposure may be 365 nanometers in wavelength and have an energy of 1000 $mJ/cm^2$.

3: disposing a mask on the metal foil. The mask may be peelable. The mask may be printed by a machine. The mask may have a pattern described above with reference to FIG. 6.

4: heating the product from the previous step to solidify the mask. The heating may include heating at 135° C. for 40 minutes.

5: etching the product from the previous step and peeling off the mask. The etching may include immersing the product in 30% $FeCl_3$ before blowing it dry.

6. disposing optically clear adhesive (OCA) glue on a protection layer. The protection layer may be PET. The protection layer may match the size of the substrate, e.g. 150 millimeters wide and 150 millimeters long. The OCA glue may be 50 micron-meters thick.

7. drilling a plurality of holes on the protection layer and the OCA glue at positions that correspond to the electrode bus bar on the substrate to expose electrodes in the following steps. The hole size may be 5 millimeters by 5 millimeters.

8. disposing protection layer with optically clear adhesive (OCA) glue on top of the substrate.

9. making electrical contacts from the exposed electrodes.

Figure 7:
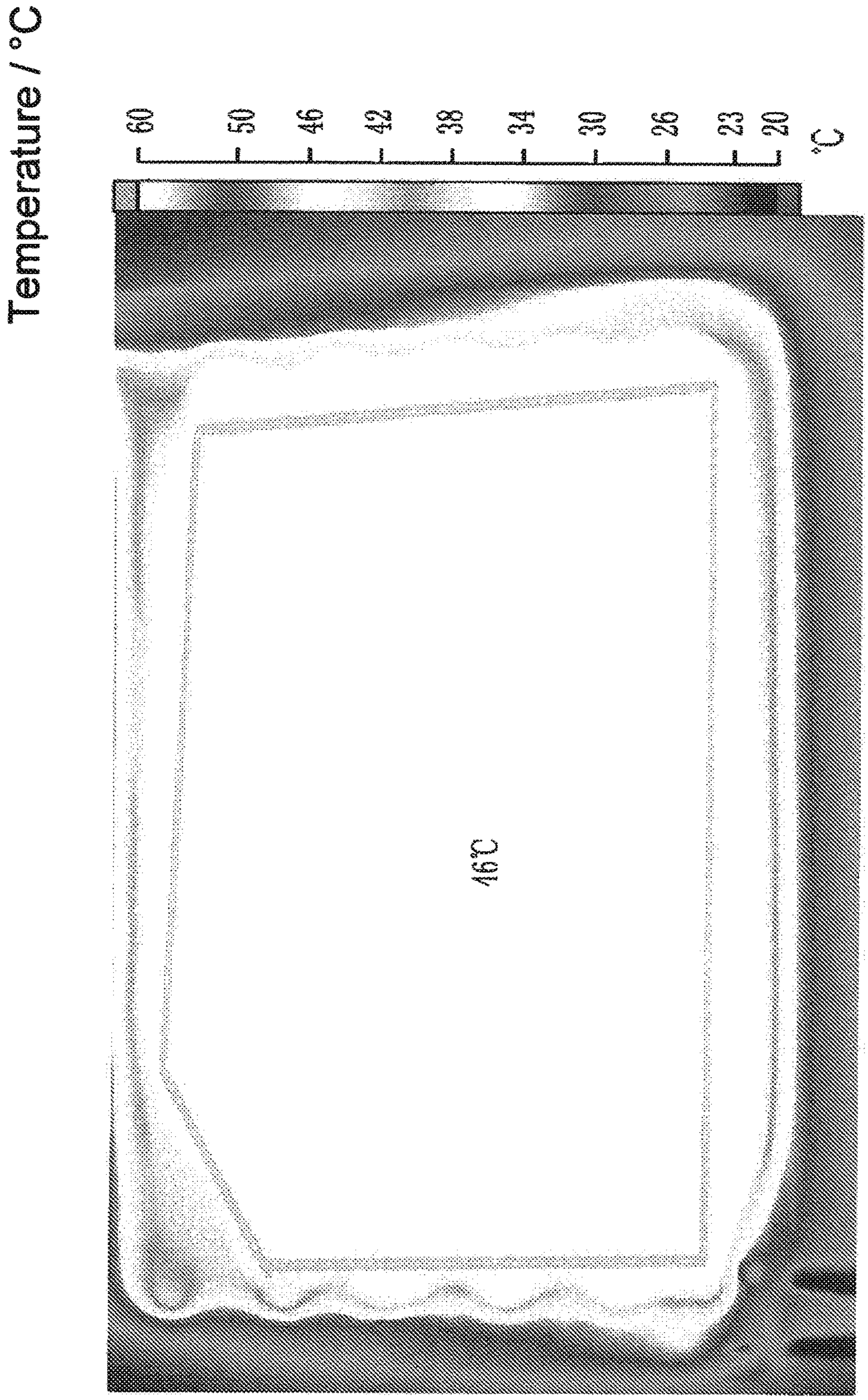
FIGS. 7-13 are graphical representations of temperature distribution in embodiments of respective low-power transparent electro-thermal film devices consistent with the present disclosure.

FIG. 7 is a graphical representation of temperature distribution 7000 in an embodiment of a low-power transparent electro-thermal film device (implementing steps 1-5) consistent with the present disclosure. 7000 may be captured by an infra-red camera. A resistance of the device is measured to be 1.7Ω. The device can reach 46° C. in 30 seconds after connecting to a 3.7 V power supply (each of the left and right half experiencing 1.85 V of power). 7000 describes temperature distribution in a heated low-power transparent electro-thermal film device described above. The average temperature is 46° C., consistent with $T=kU^2/d^2R+t$ described above. In this example, t is 22° C. and k is 160° C. $cm^2$ $W^{-1}$. In this example, heating power of the device reaches 1521 $W/m^2$ when 3.7 V of voltage is applied. Further, the traditional electro-thermal film device would have needed 616 V power input to reach the same amount of heating power, which is more than the safe power level that humans can withstand.

In another example of the heated low-power transparent electro-thermal film device described above (implementing steps 1-9), a resistance of the device is measured to be 2.5Ω. The device can reach 45° C. in 70 seconds after connecting to a 3.7 V power supply (each of the left and right half experiencing 1.85 V of power). The average temperature is 45° C., consistent with $T=kU^2/d^2R+t$ described above. In this example, t is 22° C. and k is 151° C. $cm^2$ $W^{-1}$. In this example, a voltage variation on the electrodes bus bar does not exceed 0.2% and a voltage variation on the inner electrodes does not exceed 0.004%.

[Exemplary Implementation 4]

In some embodiments, a method of fabricating the low-power transparent electro-thermal film device includes the following steps, some of which are optional:

1: disposing graphene on a transparent substrate and printing a silver paste pattern on the graphene. The graphene may be single-layer graphene, doped, and/or have a sheet resistance of 400 Ω/sq. The substrate may be polyethylene terephthalate (PET). The substrate may be 150 millimeters wide and 150 millimeters long. The printing may include screen printing. The silver paste pattern may be the pattern described above with reference to FIG. 2A. The printed silver paste may be used as electrodes. Inner electrodes are 6 millimeters apart, 108 millimeters long, 1 millimeter wide. There are 15 inner electrodes with 15 separations. The electrode bus bar is 8 millimeters wide. The silver paste may be 25 micron-meters thick.

2. solidifying the silver paste. The solidifying step may include heating in an oven at 130° C. for 40 minutes.

3. disposing optically clear adhesive (OCA) glue on a protection layer. The protection layer may be PET. The protection layer may match the size of the substrate, e.g. 150 millimeters wide and 150 millimeters long. The OCA glue may be 50 micron-meters thick.

4. drilling a plurality of holes on the protection layer and the OCA glue at positions that correspond to the electrode bus bar on the substrate to expose electrodes in the following steps. The hole size may be 5 millimeters by 5 millimeters.

5. disposing protection layer with optically clear adhesive (OCA) glue on top of the substrate patterned with the silver paste.

6. making electrical contacts from the exposed electrodes.

Figure 8:
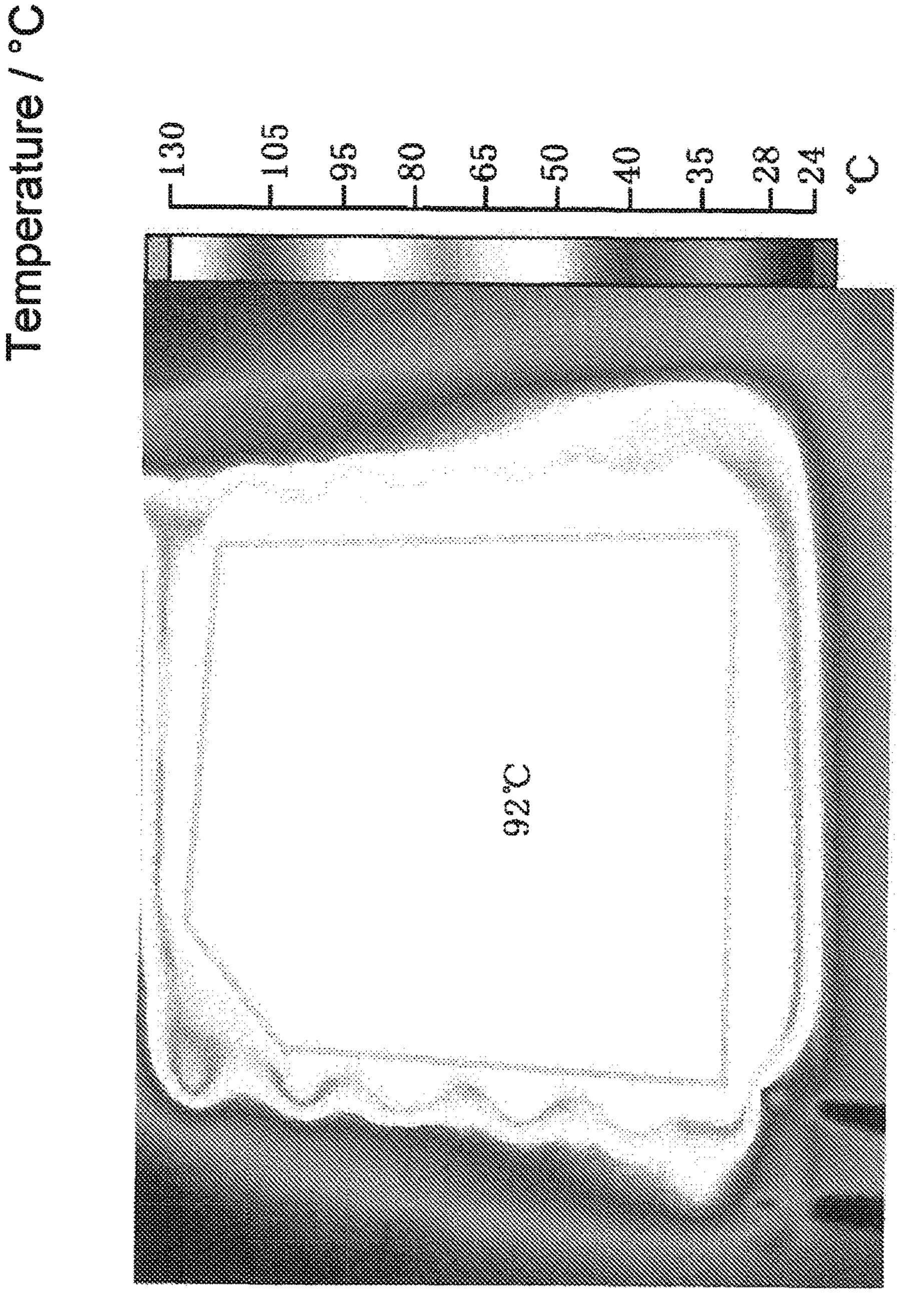

FIG. 8 is a graphical representation of temperature distribution 8000 in an embodiment of a low-power transparent electro-thermal film device consistent with the present disclosure. 8000 may be captured by an infra-red camera. A resistance of the device is measured to be 5Ω. The device can reach 92° C. in 55 seconds after connecting to a 12 V power supply. The average temperature is 92° C., consistent with $T=kU^2/d^2R+t$ described above. In this example, t is 22° C. and k is 70° C. cm$^2$ W$^{-1}$. In this example, a voltage variation on the electrodes bus bar does not exceed 0.05% and a voltage variation on the inner electrodes does not exceed 0.01%.

[Exemplary Implementation 5]

In some embodiments, a method of fabricating the low-power transparent electro-thermal film device includes the following steps and patterns described above with reference to FIG. 2A. Further, the conductor layer is single-layer graphene of 250 Ω/sq sheet resistance. The electrodes are 10 layers of graphene. In creating the 10 layer graphene, 10 single layers of graphene are stacked upon one another. Inner electrodes are 3 millimeters apart, 108 millimeters long, 1 millimeter wide. There are 15 inner electrodes with 15 separations. The electrode bus bar is 8 millimeters wide. A longest distance between two inner electrodes on one of the electrode bus bars is 60 millimeters. The electrode (10 layer graphene) is 35 nanometers thick.

Figure 9:
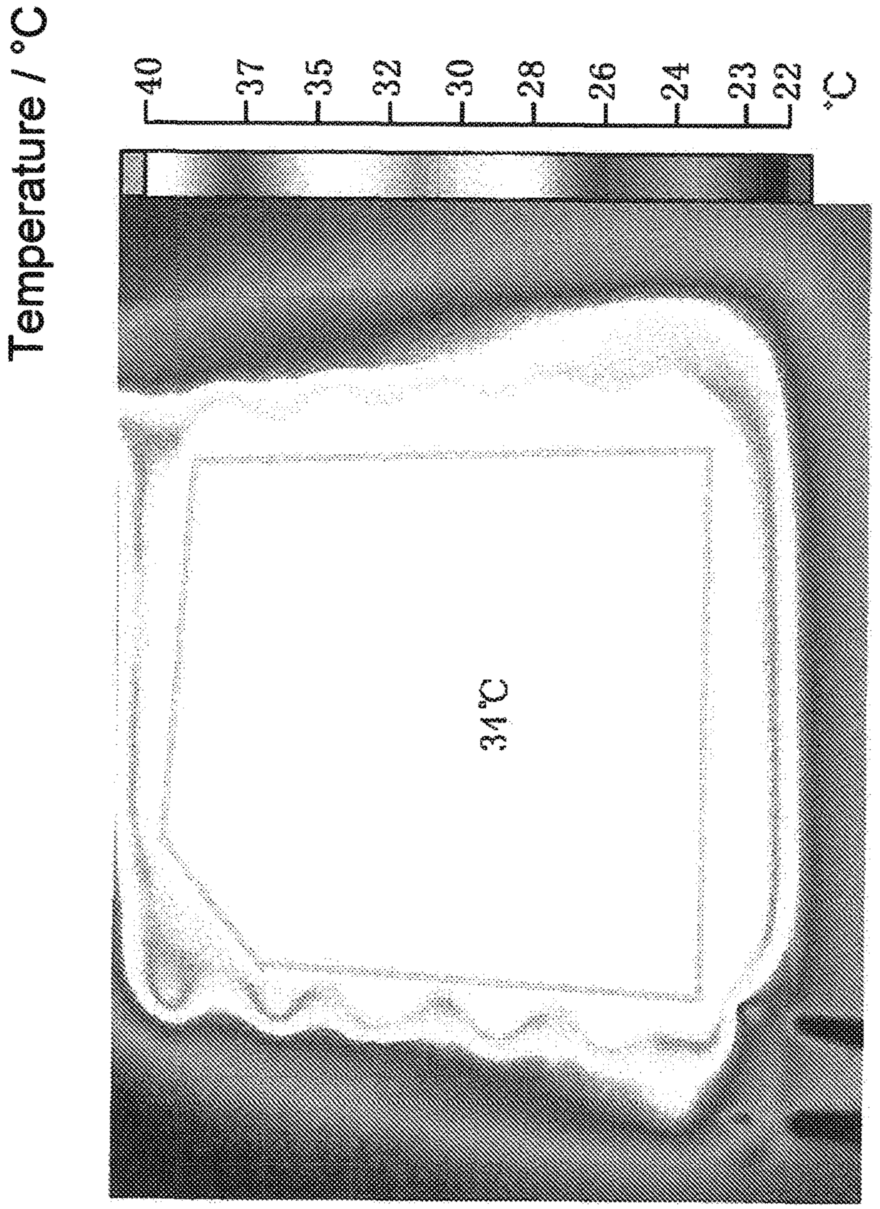

FIG. 9 is a graphical representation of temperature distribution 9000 in an embodiment of a low-power transparent electro-thermal film device consistent with the present disclosure. 9000 may be captured by an infra-red camera. A resistance of the device is measured to be 2Ω. The device can reach 34° C. (a stable temperature) in 85 seconds after connecting to a 1.5 V power supply. The average temperature is 34° C., consistent with $T=kU^2/d^2R+t$ described above. In this example, t is 22° C. and k is 120° C. cm$^2$ W$^{-1}$. In this example, a voltage variation on the electrodes bus bar does not exceed 0.1% and a voltage variation on the inner electrodes does not exceed 0.02%.

[Exemplary Implementation 6]

In some embodiments, a method of fabricating the low-power transparent electro-thermal film device includes the steps described above with reference to FIG. 2A and a pattern described above with reference to FIG. 4. Further, the conductor layer is four-layer graphene of 62.5 Ω/sq sheet resistance. Inner electrodes are 4 millimeters apart and 1 millimeter wide. There are 16 inner electrodes with 17 separations. The electrode bus bar is 8 millimeters wide. The silver paste is 25 micron-meters thick.

Figure 10:
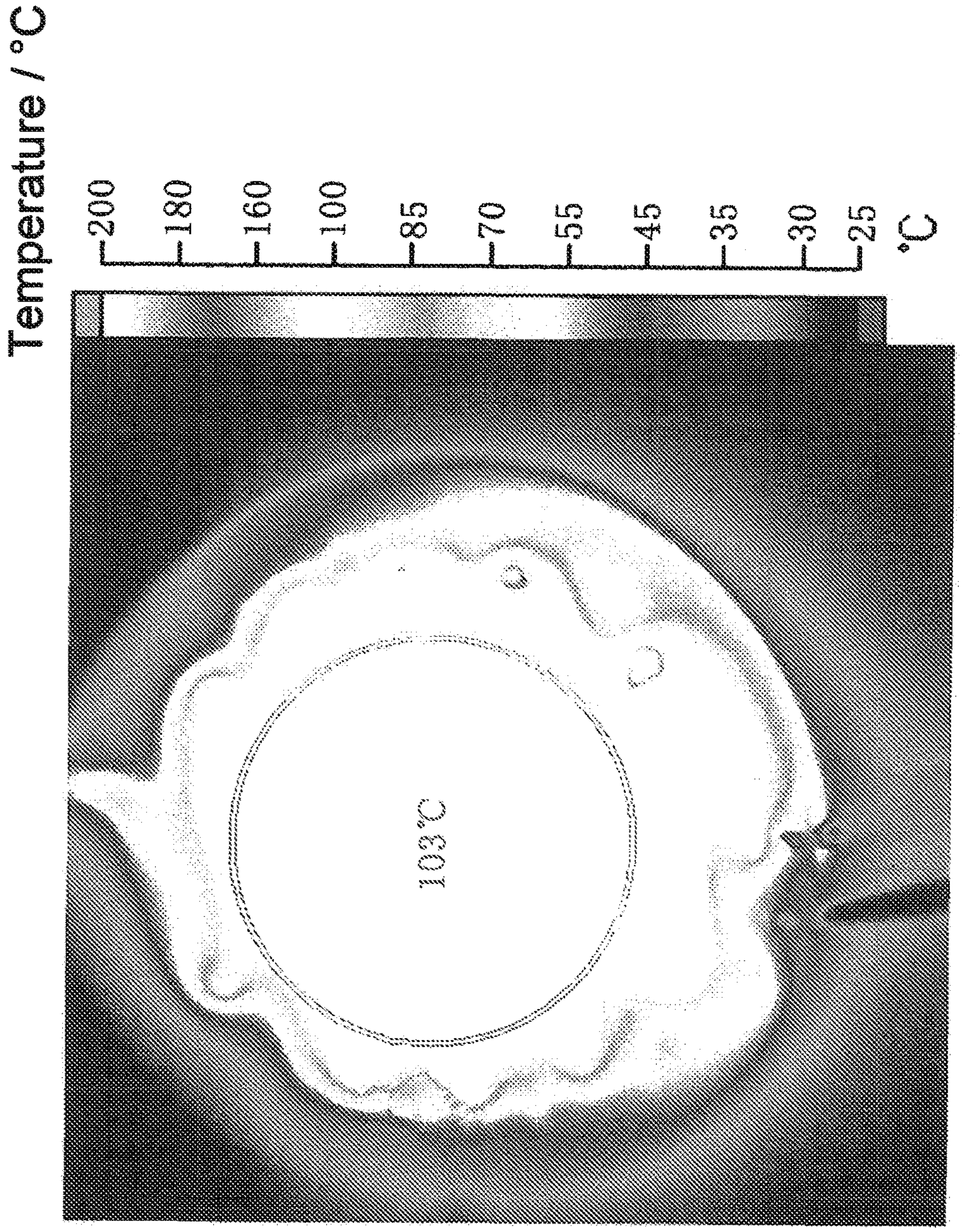

FIG. 10 is a graphical representation of temperature distribution 10000 in an embodiment of a low-power transparent electro-thermal film device consistent with the present disclosure. 10000 may be captured by an infra-red camera. A resistance of the device is measured to be 0.4Ω. The device can reach 103° C. (a stable temperature) in 100 seconds after connecting to a 3.7 V power supply. The average temperature is 103° C., consistent with $T=kU^2/d^2R+t$ described above. In this example, t is 22° C. and k is 110.9° C. cm$^2$ W$^{-1}$. In this example, a voltage variation on the electrodes bus bar does not exceed 3% and a voltage variation on the inner electrodes does not exceed 1.2%.

[Exemplary Implementation 7]

In some embodiments, a method of fabricating the low-power transparent electro-thermal film device includes the steps described above with reference to FIG. 6 and a pattern described above with reference to FIG. 2A. Further, the inner electrodes are 3 millimeters apart, 108 millimeters long and 1 millimeter wide. There are 15 inner electrodes with 15 separations. The electrode bus bar is 8 millimeters wide. The silver paste is 25 micron-meters thick.

Figure 11:
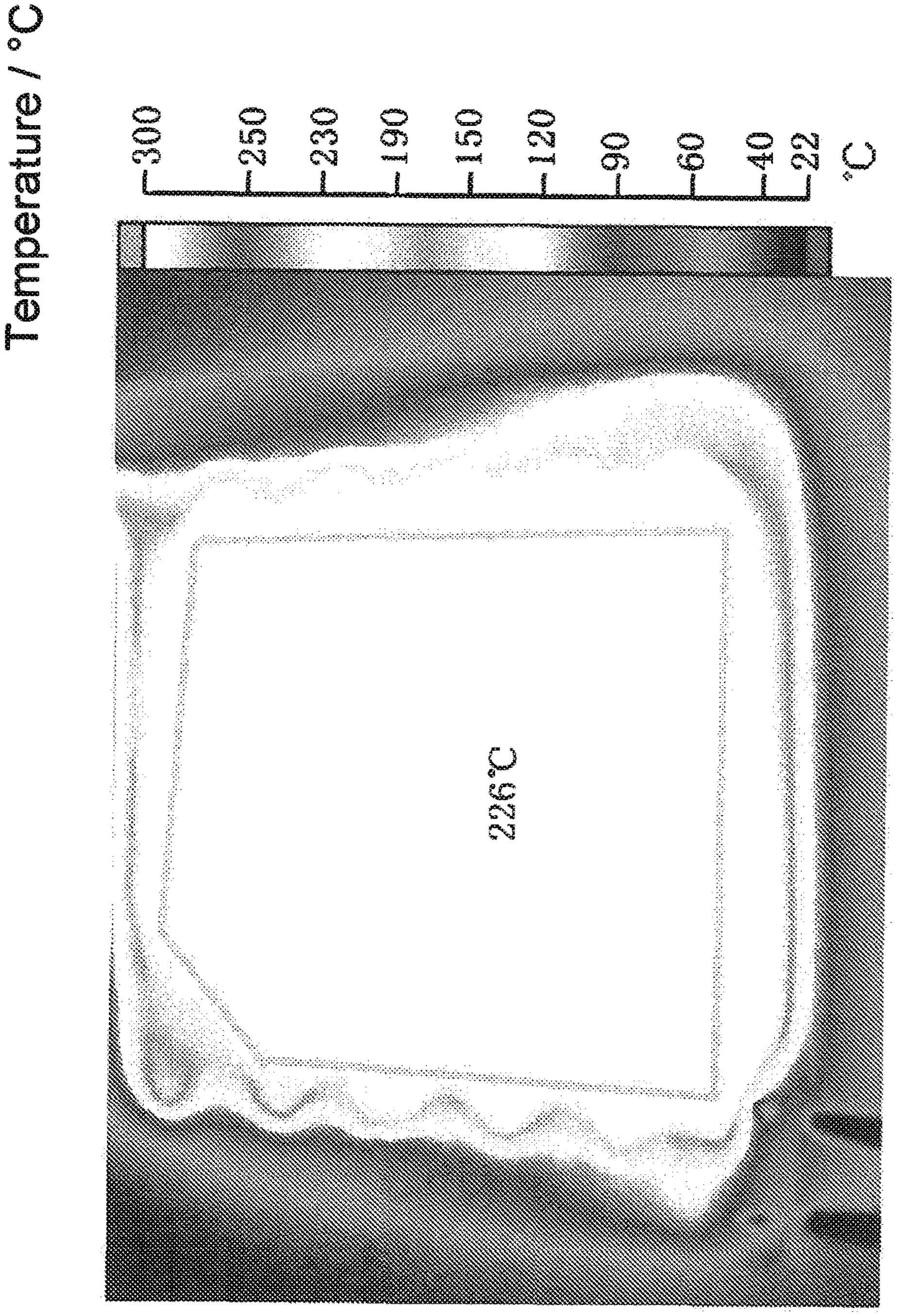

FIG. 11 is a graphical representation of temperature distribution 11000 in an embodiment of a low-power transparent electro-thermal film device consistent with the present disclosure. 11000 may be captured by an infra-red camera. A resistance of the device is measured to be 1.7Ω. The device can reach 226° C. (a stable temperature) in 100 seconds after connecting to a 12 V power supply. The average temperature is 226° C., consistent with $T=kU^2/d^2R+t$ described above. In this example, t is 22° C. and k is 32° C. cm$^2$ W$^{-1}$. In this example, a voltage variation on the electrodes bus bar does not exceed 0.9% and a voltage variation on the inner electrodes does not exceed 0.1%.

[Exemplary Implementation 8]

In some embodiments, a method of fabricating the low-power transparent electro-thermal film device includes the steps described above with reference to FIG. 2A and a pattern described above with reference to FIG. 4. Further, the inner electrodes are 2 millimeters apart, 108 millimeters long and 1 millimeter wide. There are 16 inner electrodes with 17 separations. The electrode bus bar is 8 millimeters wide. The silver paste is 25 micron-meters thick. The conductor layer is single-layer graphene of 250 Ω/sq sheet resistance.

Figure 12:
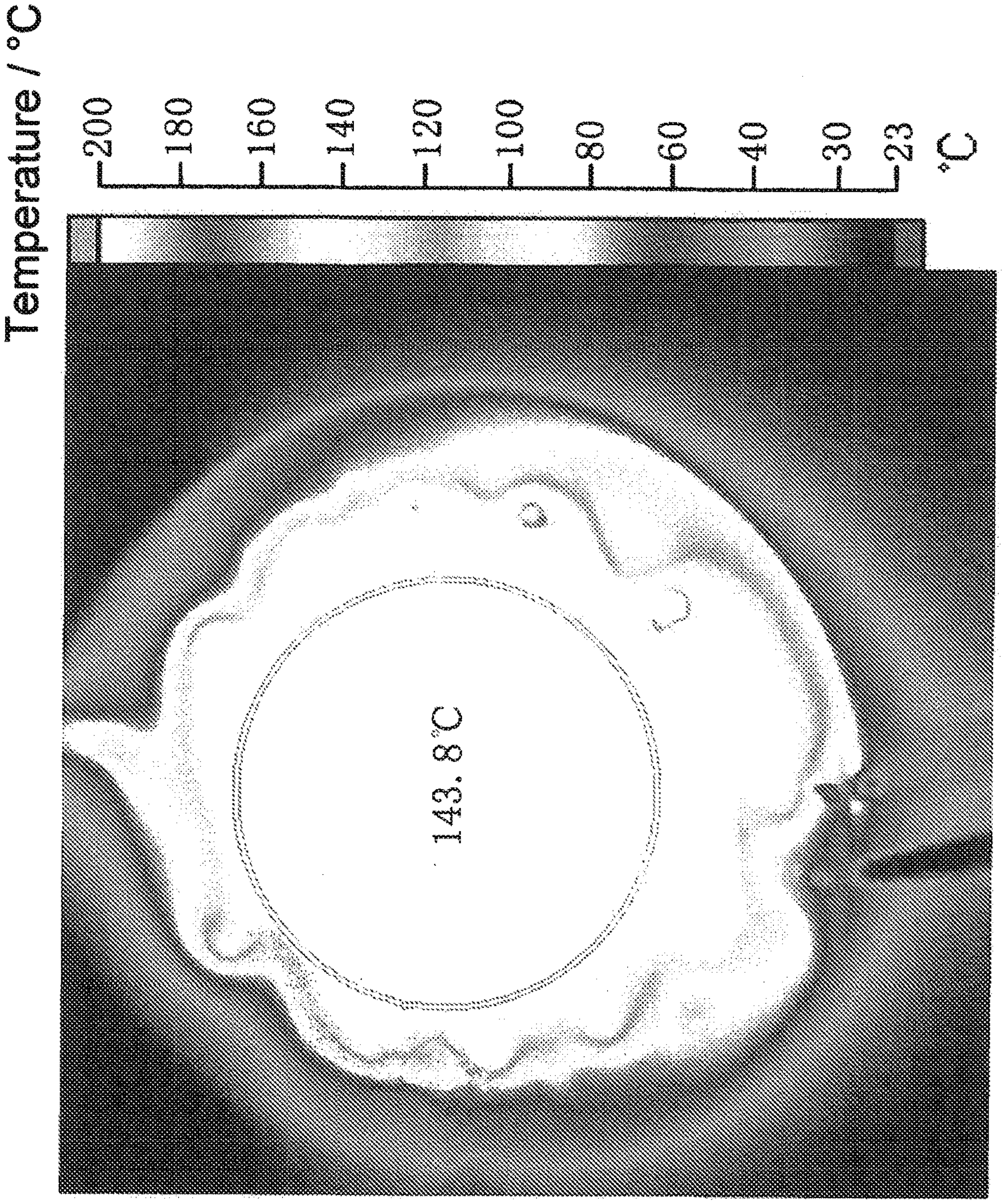

FIG. 12 is a graphical representation of temperature distribution 12000 in an embodiment of a low-power transparent electro-thermal film device consistent with the present disclosure. 12000 may be captured by an infra-red camera. A resistance of the device is measured to be 2Ω. The device can reach 143.8° C. (a stable temperature) in 100 seconds after connecting to a 3.7 V power supply. The average temperature is 143.8° C., consistent with $T=kU^2/d^2R+t$ described above. In this example, t is 22° C. and k is 89° C. cm$^2$ W$^{-1}$. In this example, a voltage variation on the electrodes bus bar does not exceed 0.04% and a voltage variation on the inner electrodes does not exceed 3%.

[Exemplary Implementation 9]

In some embodiments, a method of fabricating the low-power transparent electro-thermal film device includes the steps described above with reference to FIG. 2A and a pattern described above with reference to FIG. 2A. Further, each of the electrodes bus bars and corresponding inner electrodes are disposed at two different sides of the conductor layer. I.e. 21*a* and 22*a* disposed on a top side of the conductor layer and 21*b* and 22*b* are disposed on a bottom side of the conductor layer. The inner electrodes are 4 millimeters apart, 108 millimeters long, and 1 millimeter wide. There are 15 inner electrodes with 15 separations. The inner electrodes are 5-10 layers of graphene or a metal foil of 10-30 micron-meters, with the former being used in the following example. The electrode bus bar is 8 millimeters wide. The conductor layer is single-layer graphene of 250 Ω/sq sheet resistance.

Figure 13:
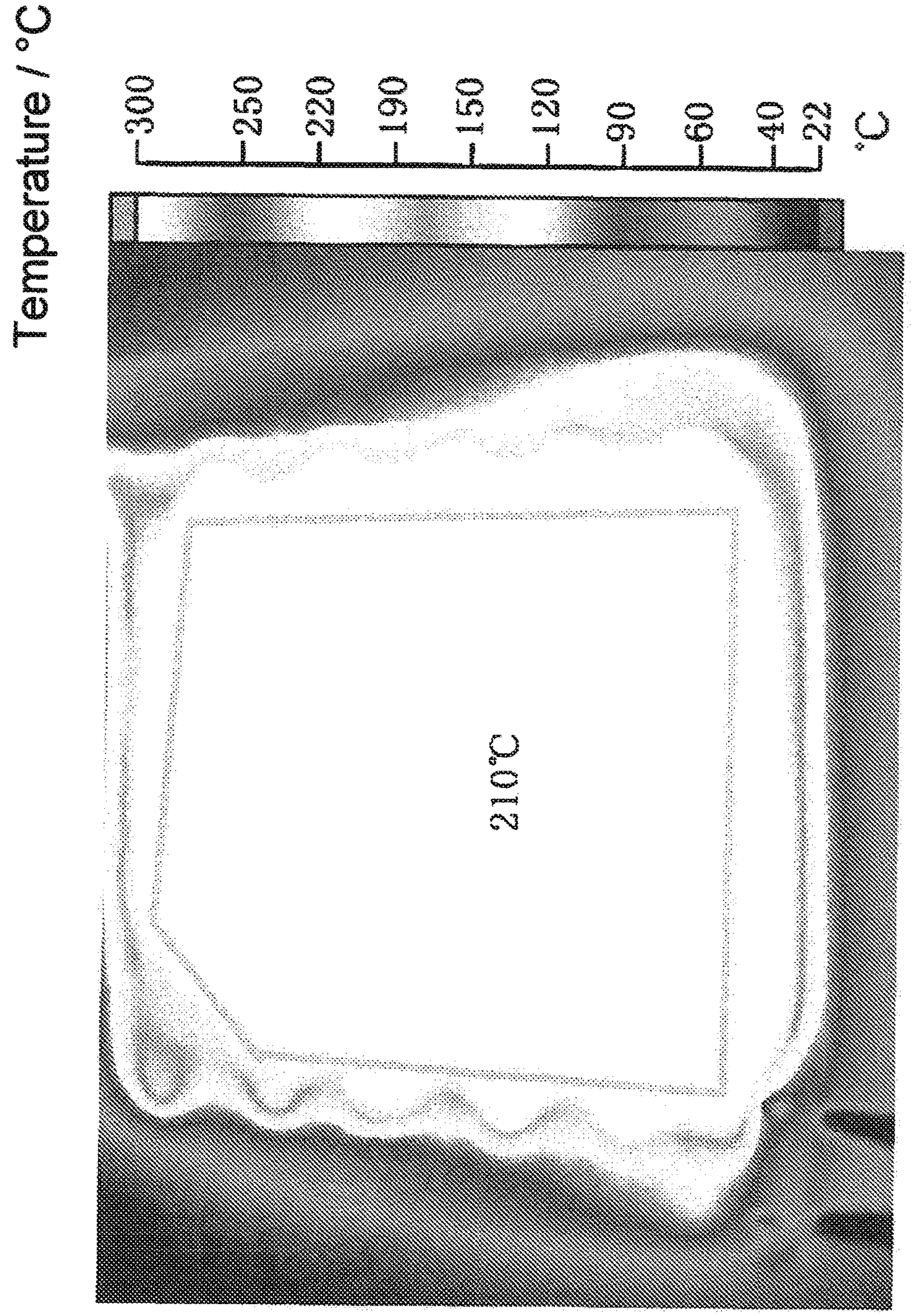

FIG. 13 is a graphical representation of temperature distribution 13000 in an embodiment of a low-power transparent electro-thermal film device consistent with the present disclosure. 13000 may be captured by an infra-red camera. A resistance of the device is measured to be 2.1Ω. The device can reach 210° C. (a stable temperature) in 30 seconds after connecting to a 7.5V power supply. The average temperature is 210° C., consistent with $T=kU^2/d^2R+t$ described above. In this example, t is 22° C. and k is 134° C. cm$^2$ W$^{-1}$. In this example, a voltage variation on the electrodes bus bar does not exceed 7% and a voltage variation on the inner electrodes does not exceed 4%.

[Exemplary Implementation 10]

Figure 14:
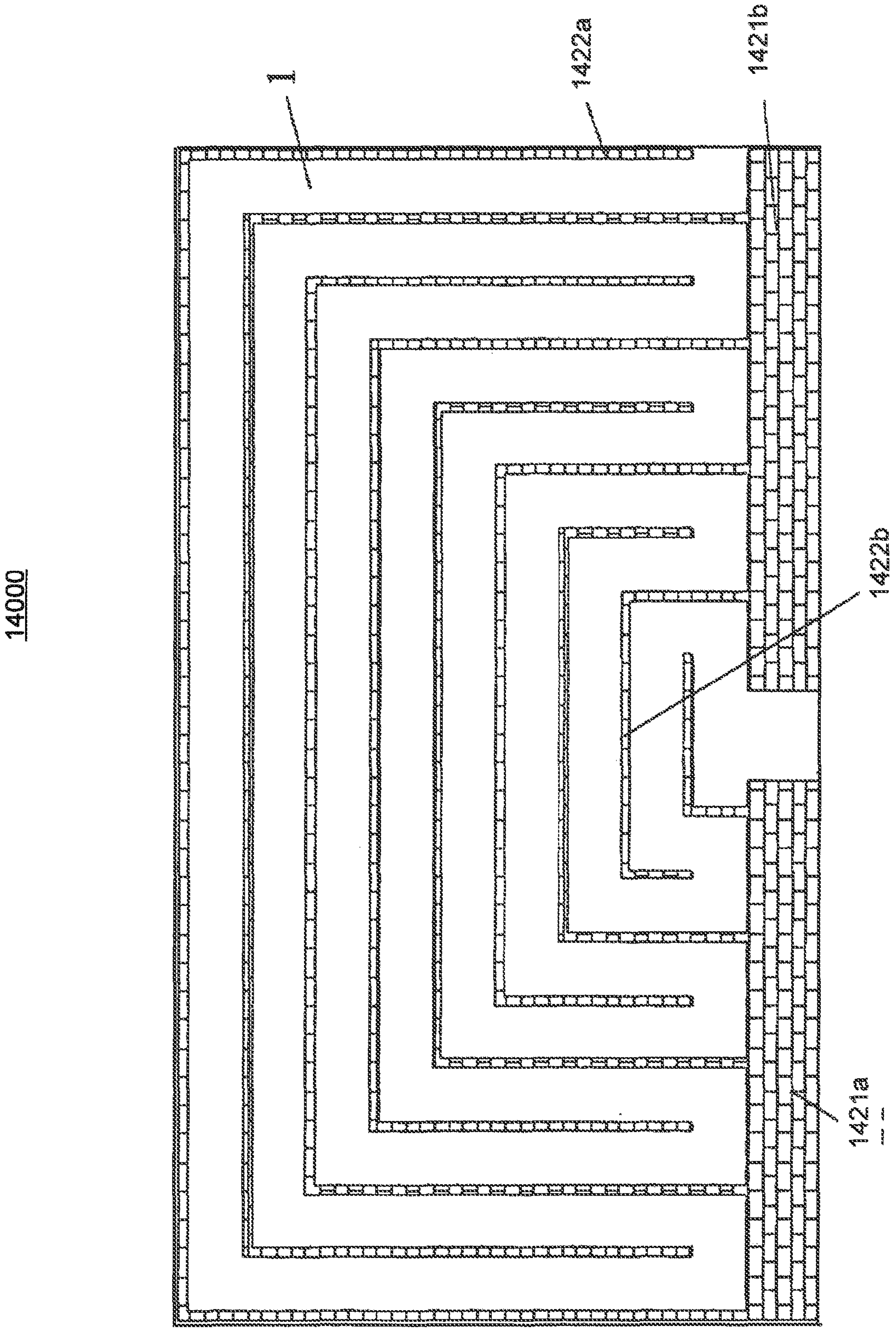
FIG. 14 is a schematic top view of an embodiment of another low-power transparent electro-thermal film device consistent with the present disclosure.

FIG. 14 is a schematic top view of an embodiment of a low-power transparent electro-thermal film device 14000 consistent with the present disclosure. The inner electrodes 1422*a* and 1422*b* are 10 millimeters apart and 1 millimeter wide. There are 9 inner electrodes with 9 separations. The electrode bus bars 1421*a* and 1422*b* are each 8 millimeters wide. The conductor layer is six-layer graphene of 41.6 Ω/sq sheet resistance. The electrodes are copper foil of 25 micron-meters thick.

Figure 15:
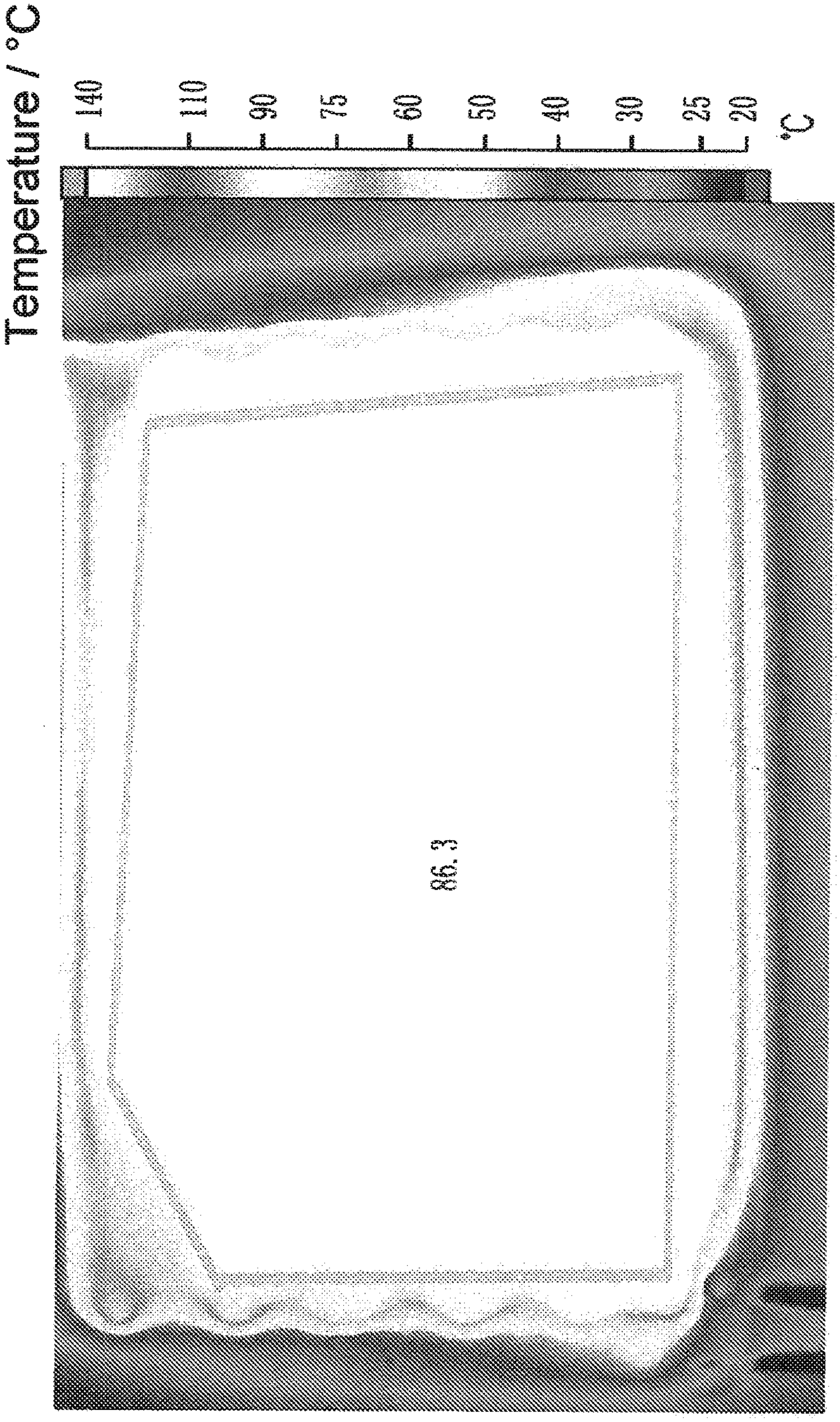
FIG. 15 is a graphical representation of temperature distribution in an embodiment of another low-power transparent electro-thermal film device consistent with the present disclosure.

FIG. 15 is a graphical representation of temperature distribution 15000 in an embodiment of a low-power transparent electro-thermal film device consistent with the present disclosure. 15000 may be captured by an infra-red camera. A resistance of the device is measured to be 0.32Ω. The device can reach 86.3° C. (a stable temperature) in 30 seconds after connecting to a 7.5 V power supply. The average temperature is 86.3° C., consistent with $T=kU^2/d^2R+t$ described above. In this example, t is 22° C. and k is 47.6° C. $cm^2\ W^{-1}$. In this example, a voltage variation on the electrodes bus bar does not exceed 2.4% and a voltage variation on the inner electrodes does not exceed 0.3%.

[Exemplary Implementation 11]

In some embodiments, a method of fabricating the low-power transparent electro-thermal film device includes the steps described above with reference to FIG. 2A and a pattern described above with reference to FIG. 2A. Further, the inner electrodes and the electrode bus bars are of different materials, e.g. the former is a transparent conducting material and the latter is a metal, or vice versa, or both are different metals. In this example, the inner electrodes are at least five-layer (e.g. ten-layer) graphene and the electrode bus bars are metal foils (e.g. platinum) or silver paste. Single-layer graphene is used for the conductor layer. The inner electrodes are 5 millimeters apart, 108 millimeters long, and 1 millimeter wide. There are 32 inner electrodes. The electrode bus bar is 8 millimeters wide and 25 micron-meters thick.

Figure 16:
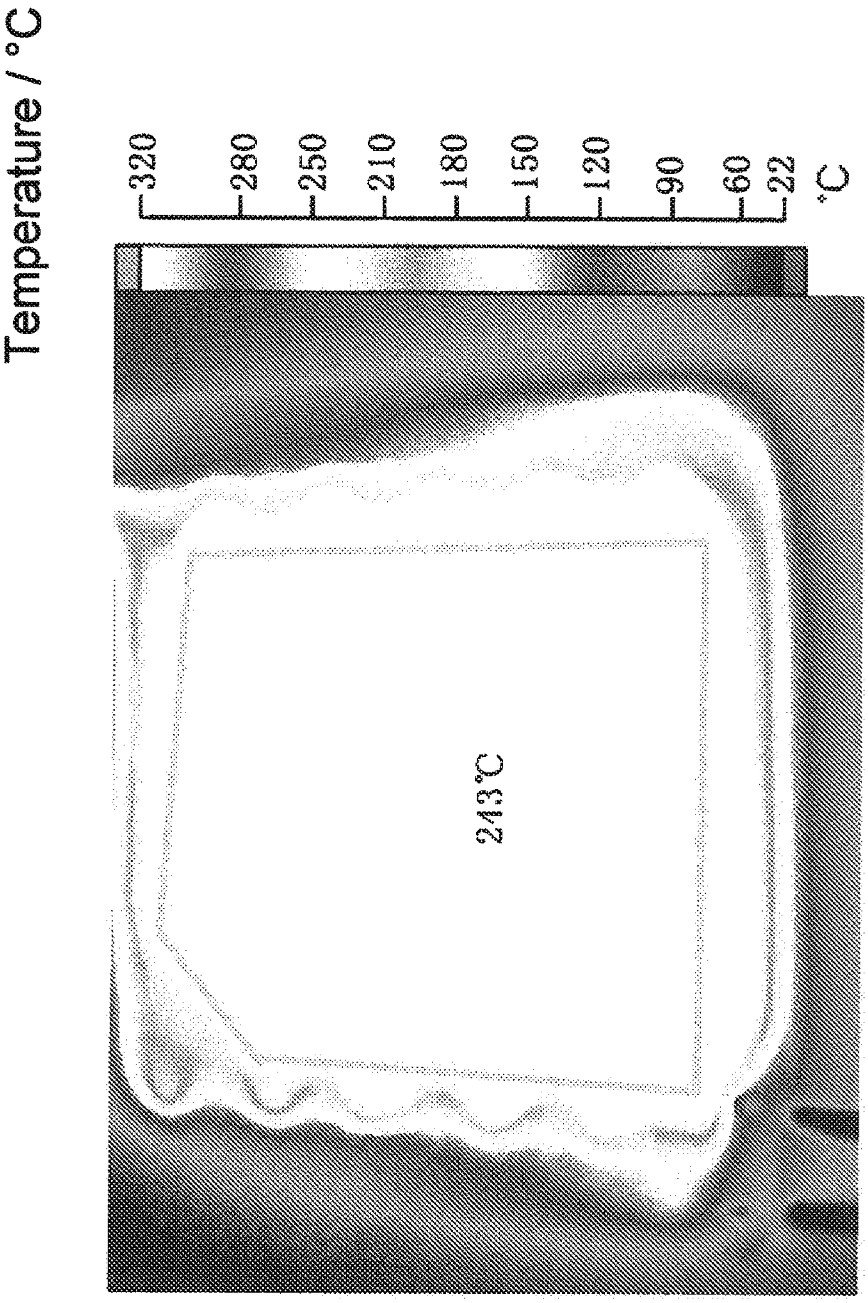
FIG. 16 is a graphical representation of temperature distribution in an embodiment of another low-power transparent electro-thermal film device consistent with the present disclosure.

FIG. 16 is a graphical representation 16000 illustrating a temperature distribution of a low-power transparent electro-thermal film device, according to an exemplary embodiment. 16000 may be captured by an infra-red camera. A resistance of the device is measured to be 1.9Ω. The device can reach 243° C. (a stable temperature) in 30 seconds after connecting to a 12 V power supply. The average temperature is 243° C., consistent with $T=kU^2/d^2R+t$ described above. In this example, t is 22° C. and k is 96° C. $cm^2\ W^{-1}$. In this example, a voltage variation on the electrodes bus bar does not exceed 1.5% and a voltage variation on the inner electrodes does not exceed 2.3%.

[Exemplary Implementation 12]

In some embodiments, a method of fabricating the low-power transparent electro-thermal film device includes the steps described above with reference to FIG. 2A and a pattern described above with reference to FIG. 2A. Further, parameters n, I, W, and H comply with: $n(n+1)I\rho_1/WHR<0.2$, such that a voltage variation on the electrodes bus bar does not exceed 10%, with n being a number of separated chambers formed by two neighboring inner electrodes, I being a length of a longest inner electrode in m, $\rho_1$ being a resistivity of the first/second electrode bus bar in Ωm, W being a width of the first/second electrode bus bar in m, H being a thickness of the first/second electrode bus bar in m, and R being a sheet resistance of the transparent conductor layer in Ω/sq.

The inner electrodes are 108 millimeters long. There are 15 separations among the inner electrodes. The electrode bus bar is 8 millimeters wide and 25 micro-meters thick. Voltages on the electrode bus bar are measured to be within 0.2% of variance. The device can reach 51° C. (a stable temperature) in 75 seconds after connecting to a 1.5 V power supply. In this example, t is 22° C.

[Exemplary Implementation 13]

In some embodiments, a method of fabricating the low-power transparent electro-thermal film device includes the steps described above with reference to FIG. 2A and a pattern described above with reference to FIG. 2A. Further, parameters n, I, w, h, and L comply with: $nI^2\rho_2/whLR<0.2$, with n being a number of separated chambers formed by two neighboring inner electrodes, I being a length of a longest inner electrode in m, $\rho_2$ being a resistivity of the inner electrodes in Ωm, w being a width of the inner electrode in m, h being a thickness of the inner electrode in m, L being a length of a longest distance between two inner electrodes on one of the first and the second electrode bus bar in m, and R being a sheet resistance of the transparent conductor layer in Ω/sq.

The inner electrodes are 108 millimeters long. There are 15 inner electrodes of 1 millimeter wide and 25 micron-meters thick, and 15 separations among the inner electrodes. The electrode bus bar is 8 millimeters wide. A longest distance between two inner electrodes on each of the electrode bus bar is 99 millimeters. Voltages on the electrode bus bar are measured to be within 0.05% of variance. In one example, the device can reach 77.4° C. (a stable temperature) in 60 seconds after connecting to a 7.5 V power supply. In this example, t is 22° C.

[Exemplary Implementation 14]

Figure 17:
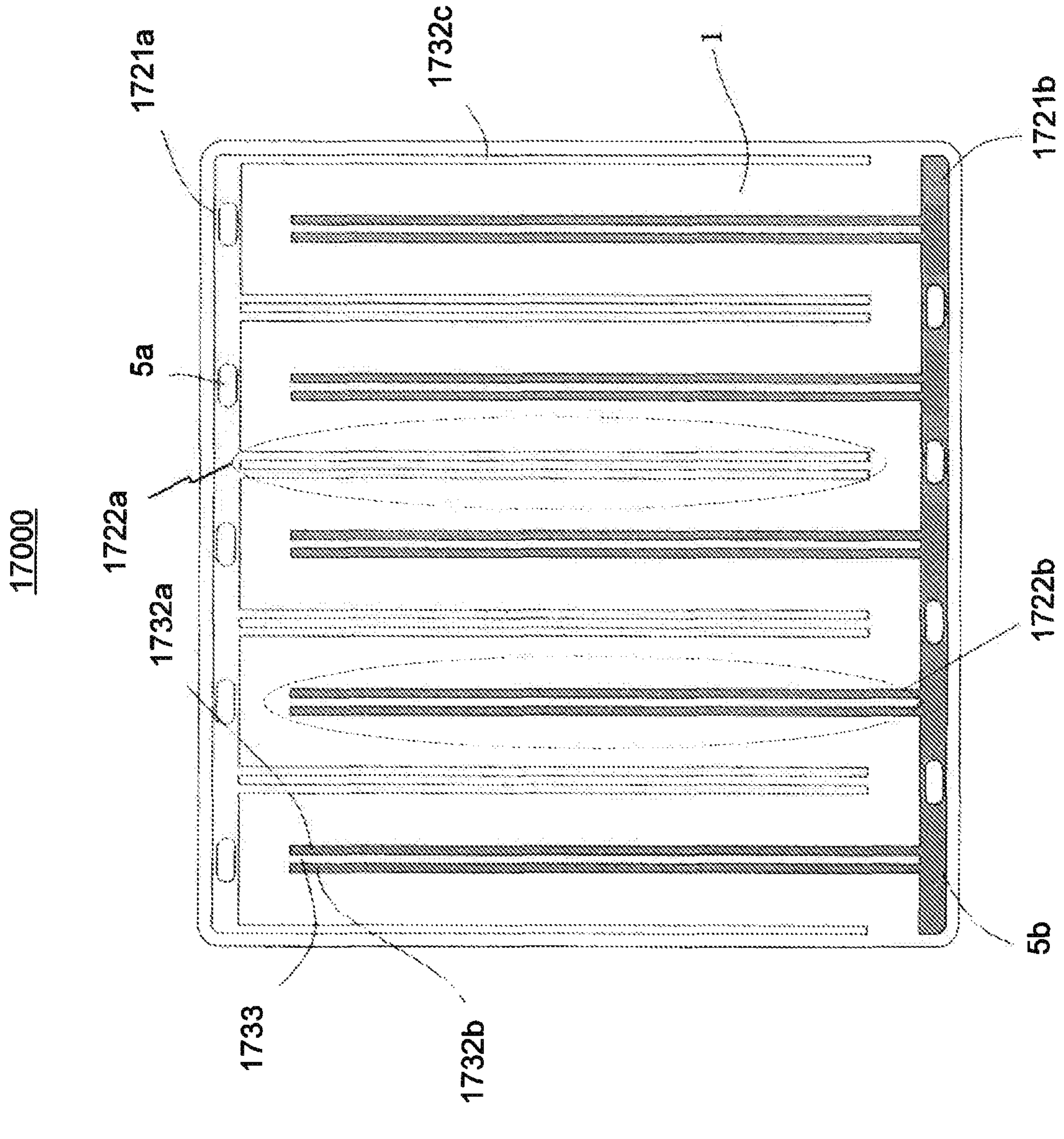
FIG. 17 is a schematic top view of an embodiment of another low-power transparent electro-thermal film device consistent with the present disclosure.

FIG. 17 is a schematic top view of an embodiment of a low-power transparent electro-thermal film device 17000 consistent with the present disclosure. The device includes a transparent conductor 1, electrode bus bars 1721*a* and 1721*b*, inner electrodes 1722*a* and 1722*b*, a separation 1733 between inner electrodes, and plurality of holes 5*a* and 5*b*. Each inner electrode may include a plurality of sub inner electrodes, for example, sub inner electrodes 1732*a* and 1732*b*. At an edge of the device, however, the inner electrodes may include a single sub inner electrode, for example, sub inner electrode 1732*c*. The sub inner electrodes may have the same width, which may be based on a current carrying capacity of each of the sub inner electrodes. The sub inner electrodes may be evenly spaced (e.g. 2 micron-meters between 1732*a* and 1732*b*) by a predetermined distance. The plurality of sub inner electrodes may be line shaped, zigzag-shaped, or curve-shaped. 1732*a*, 1732*b*, and 1732*c* may be identical in shape and material. The inner electrodes are 6 millimeters apart and 108 millimeters long. There are 11 inner electrodes and 10 separations among them. The sub inner electrodes can promote heating more evenly across the device. The sub inner electrodes can also increase flexibility of the device, i.e. the device become foldable and bendable without compromising the heating effect described in this disclosure. After 200000 times of folding (bending left edge over to right edge for 2 minutes and bending top edge over to bottom edge for 2 minutes), the heating effect is not compromised. A device with the sub inner electrodes is at least 7 times more flexible than another similar device without the sub inner electrodes. Some similar components are not labeled to keep the illustration clean. The described components form a planar pattern.

In some embodiments, a method of fabricating the device 17000 includes the following steps, some of which are optional:

1: disposing graphene on a transparent substrate. The graphene may be single-layer graphene, doped, and/or have a sheet resistance of 250 Ω/sq. The substrate may be polyethylene terephthalate (PET). The substrate may be 125 micron-meters thick.

2: printing a silver paste pattern on the graphene. The printing may include screen printing. The silver paste pattern may be the pattern described above with reference to FIG. 17. The printed silver paste may be used as electrodes. The silver paste may be 25 micron-meters thick.

3. solidifying the silver paste. The solidifying step may include heating in an oven at 130° C. for 40 minutes.

4. cutting the solidified silver paste pattern into sub inner electrodes. In one example, the separation 1733 is cut off, such that the separation 1733 and the sub inner electrodes 1732*a* and 1732*b* each have a width of 1 mm.

5. disposing optically clear adhesive (OCA) glue on a protection layer. The protection layer may be PET. The OCA glue may be 50 micron-meters thick.

6. drilling a plurality of holes 5*a* and 5*b* on the protection layer and the OCA glue at positions that correspond to the electrode bus bar on the substrate to expose electrodes in the following steps. The drilling may be laser-drilling. Each hole may have a rectangular shape or a capsule shape with flattened sides and rounded ends and each of the flattened sides being equal in length with a width of a corresponding inner electrode (or in this example, 2 sub inner electrodes constitute an inner electrode). In some embodiments, the first electrode bus bars can have a first plurality of holes at positions pointed by inner electrodes extending from the second electrode bus bar. Similarly, the second electrode bus bars can have a plurality of holes at positions pointed by inner electrodes extending from the first electrode bus bar. The holes may each having a capsule shape with flattened sides and rounded ends and each of the flattened sides being equal in length with a width of a corresponding inner electrode. These holes can increase the overall flexibility of the device.

7. disposing protection layer with optically clear adhesive (OCA) glue on top of the substrate patterned with the silver paste.

8. making electrical contacts from the exposed electrodes.

In some embodiments, the transparent conductor may have a plurality of holes of no more than 1 millimeter in diameter, evenly spaced among the inner electrodes, and lined up parallel to the inner electrodes (i.e. the holes being lined up between 2 adjacent inner electrodes). These holes can also increase the overall flexibility of the device.

Figure 18A:
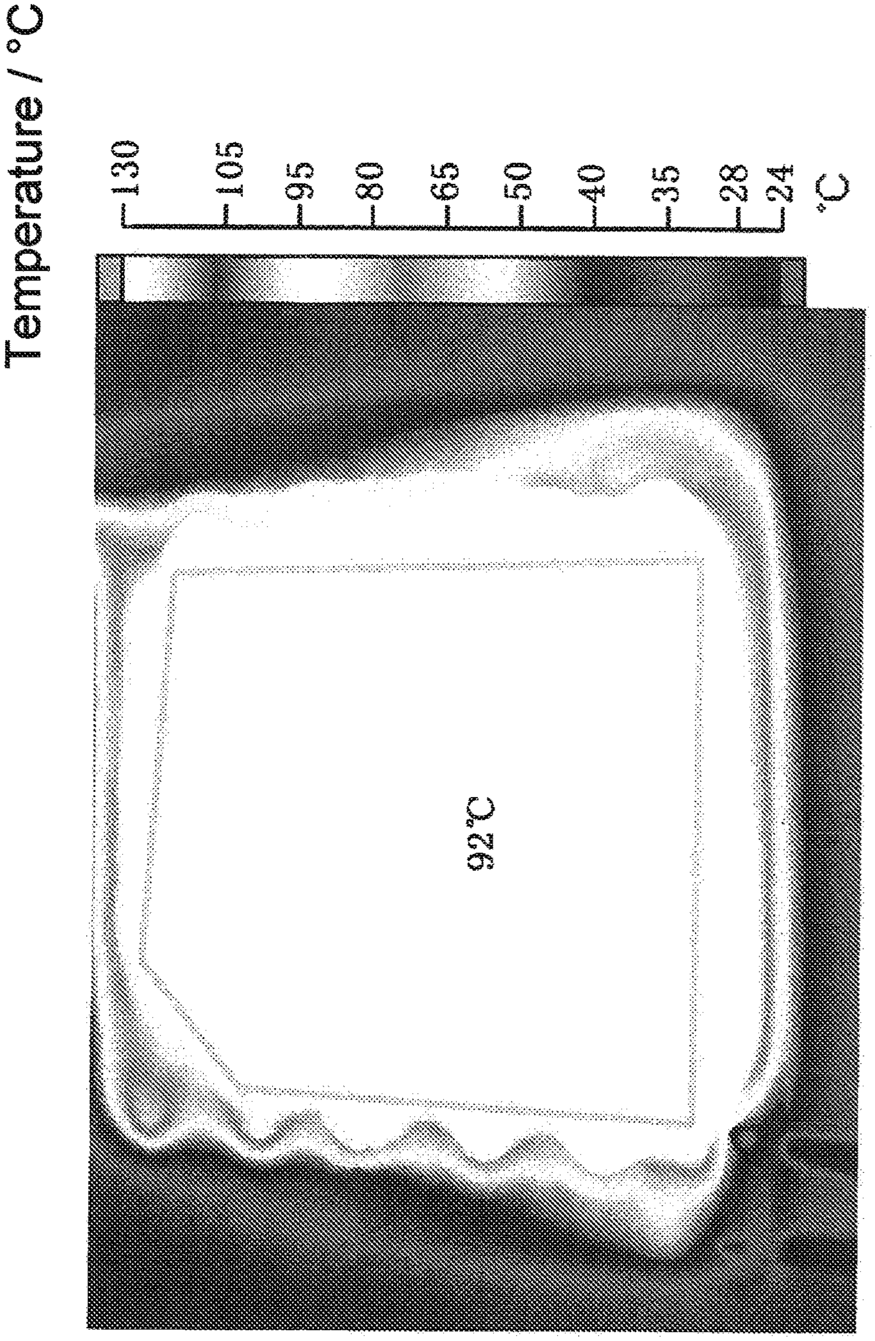
FIGS. 18A-18B are graphical representations of temperature distribution in an embodiment of another low-power transparent electro-thermal film device consistent with the present disclosure.

FIG. 18A is graphical representation of temperature distribution 18000*a* in an embodiment of a low-power transparent electro-thermal film device consistent with the present disclosure. 18000*a* may be captured by an infra-red camera. 18000*a* describes temperature distribution in a heated low-power transparent electro-thermal film device described above.

Figure 18B:
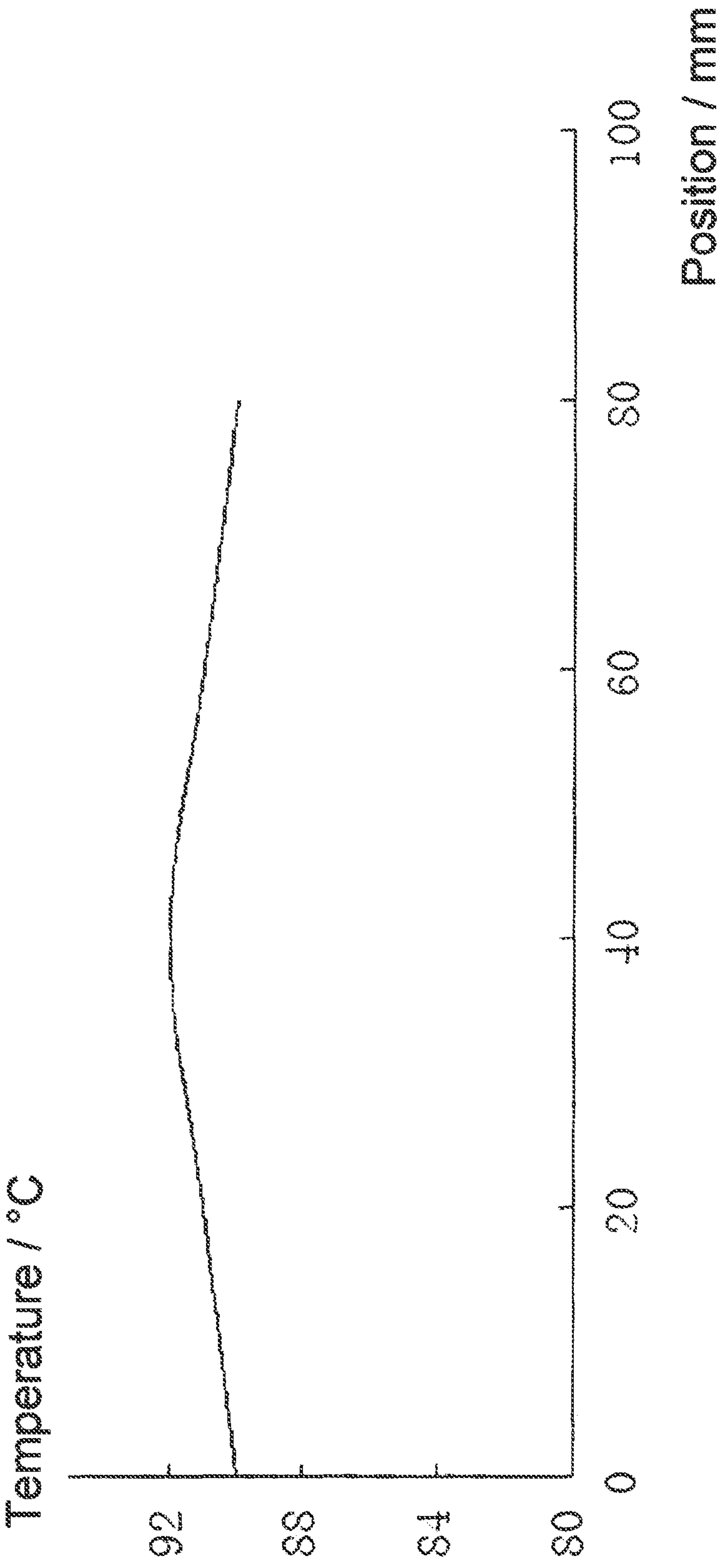

FIG. 18B is a graphical representation 18000*b* of temperature distribution in an embodiment of a low-power transparent electro-thermal film device consistent with the present disclosure. 18000*b* quantitatively describes the temperature distribution across the device. The average temperature reached is 92.3° C., consistent with configured to $T=kU^2/d^2R+t$, with T being a final temperature the device rise to when subjected to an input power, t being a starting temperature in ° C., T being the final temperature in ° C., U being the input power in V and no more than 12V, d being a distance between two neighboring inner electrodes, R being a sheet resistance of the transparent conductor layer in Ω/sq, and k being a constant in a range of 10-200° C. $cm^2$ $W^{-1}$ and being inversely proportional to a thermal conductance between the device and the air. In one example, k is 112° C. $cm^2$ $W^{-1}$. In this example, heating power of the device reaches 1300 $W/m^2$ when 3.7V of voltage is applied, much more than that of a traditional electro-thermal film device reaching no more than 5 $W/m^2$ with the same power supply. Further, the traditional electro-thermal film device would have needed 60V power input to reach the same amount of heating power, which is more than the safe power level that humans can withstand.

[Exemplary Implementation 15]

In some embodiments, a width of the electrode bus bar and a number of sub inner electrodes are adjusted so that voltages on the electrode bus bar are within 10% of variance. In one example, 15 inner electrodes of 108 millimeters long have 14 separations of 6 millimeters wide between one another. The electrode bus bar is 8 millimeters wide. Voltages on the electrode bus bars are tested to be within 0.5% of fluctuation.

[Exemplary Implementation 16]

Figure 19:
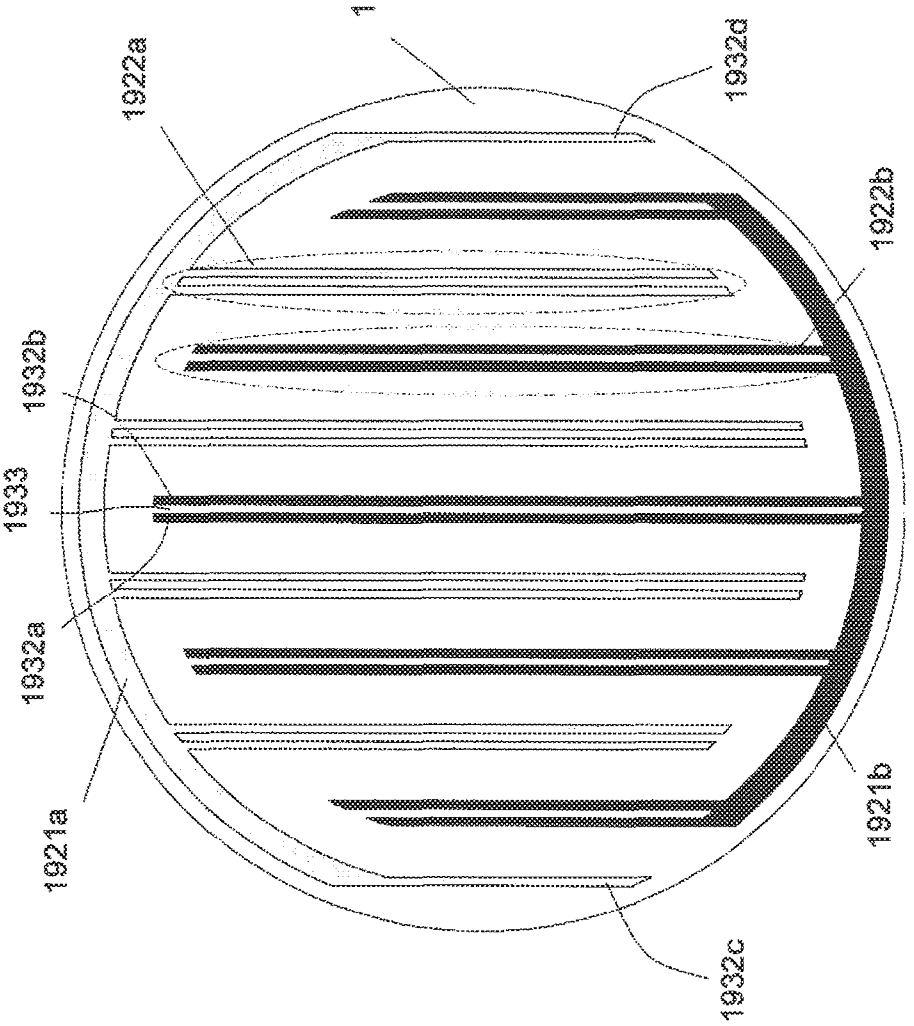
FIG. 19 is a schematic top view of an embodiment of another low-power transparent electro-thermal film device consistent with the present disclosure.

FIG. 19 is a schematic top view of an embodiment of a low-power transparent electro-thermal film device 19000 consistent with the present disclosure. The device includes a transparent conductor 1, electrode bus bars 1921*a* and 1921*b*, inner electrodes 1922*a* and 1922*b*, and a separation 1933 between inner electrodes. Each inner electrode may include a plurality of sub inner electrodes, for example, sub inner electrodes 1932*a* and 1932*b*. At an edge of the device, however, the inner electrodes may include a single sub inner electrode, for example, sub inner electrode 1932*c* or 1932*d*.

In some embodiments, a method of fabricating the device 19000 includes the following steps, some of which are optional:

1: disposing graphene on a metal foil and gluing the graphene with a substrate. The graphene may be double-layer graphene. The graphene may be doped and have a sheet resistance of 120 Ω/sq. The substrate may be polyethylene terephthalate (PET). The substrate may be 125 micron-meters thick. The glue may be ultra-violet curable adhesive. The copper foil may be 25 micron-meters thick.

2: curing the glue under ultra-violet exposure. The ultra-violet light may have a wavelength of 365 nm and an energy of 1000 $mJ/cm^2$.

3: disposing a mask on the metal foil. In an example, the mask is peelable. The mask may be printed. The mask may have a pattern described in FIG. 5. The separation 5222 is 3 millimeters. A longest inner electrode is 108 mm. The device 5000 includes 11 inner electrodes and 10 separations alternatively separating the inner electrodes.

4: heating the product from step 3 to solidify the mask. The heating may include heating at 135° C. for 40 minutes.

5: cutting the solidified silver paste patterns into sub inner electrodes.

6: etching the product from step 5 and peeling off the mask. The etching may be done via a photolithography. The etching may include immersing the product from step 5 in 30% $FeCl_3$ before blowing it dry.

7. disposing optically clear adhesive (OCA) glue on a protection layer. The protection layer may be PET. The OCA glue may be 50 micron-meters thick.

8. drilling a plurality of holes 5*a* and 5*b* on the protection layer and the OCA glue at positions that correspond to the electrode bus bar on the substrate to expose electrodes in the following steps. The drilling may be laser-drilling. Each hole may have a rectangular shape or a capsule shape with flattened sides and rounded ends and each of the flattened sides being equal in length with a width of a corresponding inner electrode.

9. disposing protection layer with optically clear adhesive (OCA) glue on top of the substrate.

10. making electrical contacts from the exposed electrodes.

In an examples of the embodiments described above, a resistance of the device 5000 is measured to be 2.5Ω. A stable condition can be reached in 50 seconds after connecting the device to a 3.7 V power supply.

Figure 20A:
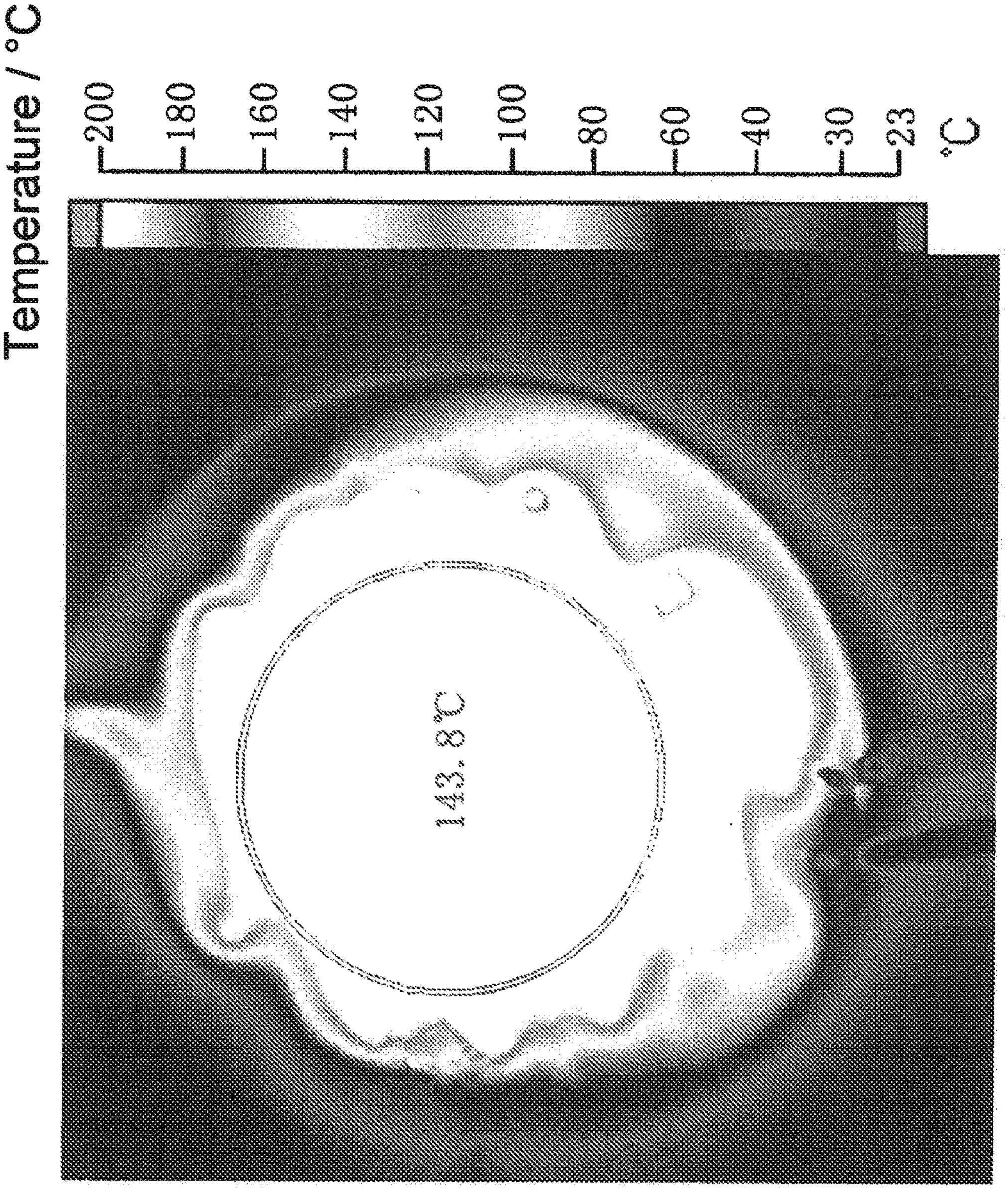
FIGS. 20A-20B are graphical representations of temperature distribution in an embodiment of another low-power transparent electro-thermal film device consistent with the present disclosure.

FIG. 20A is a graphical representation of temperature distribution 20000*a* in an embodiment of a low-power transparent electro-thermal film device consistent with the present disclosure. 20000*a* may be captured by an infra-red camera. 20000*a* describes temperature distribution in a heated low-power transparent electro-thermal film device described above.

Figure 20B:
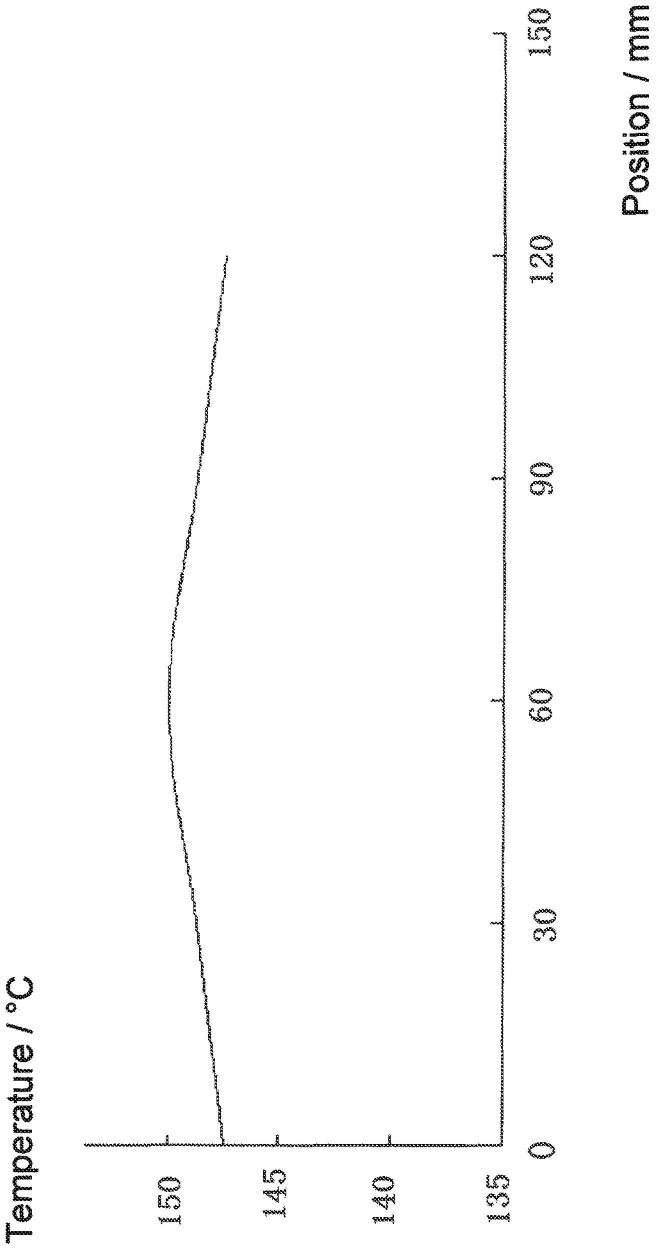

FIG. 20B is graphical representations of temperature distribution 20000*b* in an embodiment of a low-power transparent electro-thermal film device consistent with the present disclosure. 20000*b* quantitatively describes the temperature distribution across the device. The average temperature reached is 143.8° C., consistent with configured to $T=kU^2/d^2R+t$, with T being a final temperature the device rise to when subjected to an input power, t being a starting temperature in ° C., T being the final temperature in ° C., U being the input power in V and no more than 12 V, d being a distance between two neighboring inner electrodes, R being a sheet resistance of the transparent conductor layer in Ω/sq, and k being a constant in a range of 10-200° C. $cm^2$ $W^{-1}$ and being inversely proportional to a thermal conductance between the device and the air. In one example, k is 96° C. $cm^2$ $W^{-1}$.

[Exemplary Implementation 17]

In some embodiments, a width of the electrode bus bar and a number of sub inner electrodes are adjusted so that voltages on the electrode bus bar are within 10% of variance. In one example, 11 inner electrodes of no more than 130 millimeters long have 10 separations of 4 millimeters wide between one another. The electrode bus bar is 10 millimeters wide. Voltages on the electrode bus bars are tested to be within 3.6% of fluctuation.

The specification has described methods, apparatus, and systems for low-power transparent electro-thermal film devices. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A low-power transparent electro-thermal film device, comprising:

a transparent substrate;

a transparent conductor layer disposed on a surface of the transparent substrate; and inner electrodes disposed on the transparent conductor layer and including first inner electrodes extending from a first electrode bus bar and second inner electrodes extending from a second electrode bus bar, the first inner electrodes inter-locking with the second inner electrodes, wherein each of the first inner electrodes and the second inner electrodes disposed in an interior of the device comprises a pair of spaced-apart sub inner electrodes disposed in parallel with each other, and each of the first inner electrodes disposed in an edge of the device comprises a single sub inner electrode, wherein the transparent conductor layer is continuous between the pair of spaced-apart sub inner electrodes and between the first electrode bus bar and the second electrode bus bar.

2. The device of claim 1, wherein each of the first inner electrodes and the second inner electrodes has a constant width.

3. The device of claim 1, wherein each of the sub inner electrodes have an equal width, the equal width being determined based on a current carrying capacity of each of the sub inner electrodes.

4. The device of claim 1, wherein each of the pairs of sub inner electrodes are evenly spaced apart from an adjacent pair of sub inner electrodes.

5. The device of claim 1, wherein the first electrode bus bar comprises first holes and the second electrode bus bar comprises second holes.

6. The device of claim 5, wherein each of the first holes is evenly spaced apart by a distance, and each of the second holes is evenly spaced apart by the distance.

7. The device of claim 5, wherein each of the first holes is positioned to face a corresponding pair of sub inner electrodes of the second inner electrodes, and each of the second holes is positioned to face a corresponding pair of sub inner electrodes of the first inner electrodes.

8. The device of claim 7, wherein each of the first holes comprise a capsule with flattened sides and rounded ends, each of the flattened sides being equal in length.

9. The device of claim 1, wherein a distance between a second inner electrode disposed in the edge of the device and an adjacent second inner electrode disposed in the interior of the device is equal to a distance between adjacent second inner electrodes disposed in the interior of the device.

10. The device of claim 1, wherein each of the first inner electrodes extends from the first electrode bus bar toward the second electrode bus bar, and the device comprises gaps between an end of each of the first inner electrodes and the second electrode bus bar, each of the gaps being equal.

11. The device of claim 10, wherein each of the second inner electrodes extends from the second electrode bus bar toward the first electrode bus bar, and the device comprises gaps between an end of each of the second inner electrodes and the first electrode bus bar, each of the gaps between the end of each of the second inner electrodes and the first electrode bus bar being equal in distance with each of the gaps between the end of each of the first inner electrodes and the second electrode bus bar.

12. The device of claim 1, wherein:

the first electrode bus bar connects the first inner electrodes to a positive power input;

the second electrode bus bar connects the second inner electrodes to a negative power input; and a current, when the first electrode bus bar is connected with the positive power input and the second electrode bus bar is connected with the negative power input, sequentially flows from the first electrode bus bar, to the first inner electrodes, to the second inner electrodes, then to the second electrode bus bar.

13. The device of claim 1, wherein the pair of spaced-apart sub inner electrodes is line-shaped, zigzag-shaped, or curve-shaped.

14. The device of claim 1, wherein each one of the first inner electrodes is separated from a neighboring interlocking second inner electrode of the second inner electrodes by the transparent conductor layer.

15. The device of claim 1, wherein the transparent conductor layer comprises at least one of graphene, carbon nanotube, Indium tin oxide (ITO), Fluorine-doped tin oxide (FTO), or Aluminum-doped zinc oxide (AZO);

the inner electrodes comprise at least one of silver, silver paste, copper, copper paste, aluminum, ITO, or graphene;

the transparent substrate comprises at least one of polyethylene terephthalate (PET), polyvinyl chloride (PVC), polyethylene (PE), polycarbonate (PC), polymethyl methacrylate (PMMA), polyvinylidene fluoride (PVDF), polyaniline (PANI), or multi-layer graphene.

16. The device of claim 15, wherein the transparent conductor layer comprises a single layer graphene.

17. The device of claim 15, wherein the transparent conductor layer comprises graphene doped with an inorganic or organic dopant; and the device further comprises a protective layer over the inner electrodes and the transparent conductor layer, the protection layer comprising at least one of PET, PVC, PE, or PC separate from the at least one of PET, PVC, PE, PC, PMMA, PVDF, PANI, or multi-layer graphene of the transparent substrate.

18. The device of claim 1, wherein the first inner electrodes or the second inner electrodes are line-shaped, wave-shaped, or saw-tooth shaped.

19. The device of claim 1, wherein all of the second inner electrodes are disposed in the interior of the device.

* * * * *